United States Patent
Kurokawa et al.

(10) Patent No.: US 11,508,408 B2
(45) Date of Patent: *Nov. 22, 2022

(54) MAGNETIC TAPE HAVING CHARACTERIZED MAGNETIC LAYER, MAGNETIC TAPE CARTRIDGE, AND MAGNETIC TAPE APPARATUS

(71) Applicant: FUJIFILM Corporation, Tokyo (JP)

(72) Inventors: Takuto Kurokawa, Minami-ashigara (JP); Naoki Sano, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/160,535

(22) Filed: Jan. 28, 2021

(65) Prior Publication Data
US 2021/0241792 A1  Aug. 5, 2021

(30) Foreign Application Priority Data
Jan. 31, 2020 (JP) .............................. JP2020-015559

(51) Int. Cl.
G11B 5/706 (2006.01)
G11B 5/58 (2006.01)
G11B 5/714 (2006.01)
G11B 5/735 (2006.01)
G11B 5/008 (2006.01)
G11B 5/708 (2006.01)

(52) U.S. Cl.
CPC ...... *G11B 5/70678* (2013.01); *G11B 5/00817* (2013.01); *G11B 5/582* (2013.01); *G11B 5/7085* (2013.01); *G11B 5/714* (2013.01); *G11B 5/7356* (2019.05)

(58) Field of Classification Search
None
See application file for complete search history.

(56) References Cited

U.S. PATENT DOCUMENTS

| | | | |
|---|---|---|---|
| 7,755,863 B2 | 7/2010 | Neumann et al. | |
| 8,535,817 B2 * | 9/2013 | Imaoka | G11B 5/7085 428/844 |
| 8,947,984 B2 | 2/2015 | Hattori et al. | |
| 9,502,066 B2 | 11/2016 | Hosoya | |
| 10,366,721 B2 | 7/2019 | Kasada | |
| 10,679,657 B2 * | 6/2020 | Kurokawa | G11B 5/127 |
| 10,741,208 B2 * | 8/2020 | Kurokawa | G11B 5/127 |
| 10,811,048 B2 * | 10/2020 | Ozawa | G11B 5/70684 |
| 11,189,318 B2 * | 11/2021 | Kasada | G11B 5/73923 |
| 11,211,087 B2 * | 12/2021 | Ozawa | G11B 5/7358 |
| 11,250,881 B2 * | 2/2022 | Kasada | G11B 5/712 |
| 11,270,725 B2 * | 3/2022 | Sano | G11B 5/735 |
| 11,270,728 B2 * | 3/2022 | Kurokawa | G11B 5/7356 |
| 11,302,357 B2 * | 4/2022 | Sano | G11B 5/70678 |
| 2010/0323222 A1 | 12/2010 | Nakashio et al. | |
| 2012/0045664 A1 | 2/2012 | Tanaka et al. | |
| 2015/0187380 A1 | 7/2015 | Shirata | |
| 2016/0064025 A1 | 3/2016 | Kurokawa et al. | |
| 2016/0171993 A1 | 6/2016 | Okubo | |
| 2019/0304498 A1 * | 10/2019 | Ozawa | G11B 5/127 |
| 2020/0090694 A1 * | 3/2020 | Sano | G11B 5/73927 |
| 2020/0251136 A1 * | 8/2020 | Ozawa | G11B 5/78 |
| 2020/0251138 A1 * | 8/2020 | Ozawa | G11B 5/00813 |
| 2020/0302962 A1 * | 9/2020 | Sawayashiki | G11B 5/7358 |
| 2020/0312361 A1 * | 10/2020 | Kasada | G11B 5/70678 |
| 2020/0342901 A1 | 10/2020 | Enomoto et al. | |
| 2020/0342903 A1 * | 10/2020 | Kasada | G01B 9/02 |
| 2020/0365179 A1 * | 11/2020 | Kasada | G01B 11/14 |
| 2021/0090602 A1 * | 3/2021 | Sano | G11B 5/7356 |
| 2021/0287702 A1 * | 9/2021 | Ozawa | G11B 5/70 |
| 2021/0375311 A1 * | 12/2021 | Ozawa | G11B 5/7013 |

FOREIGN PATENT DOCUMENTS

| | | |
|---|---|---|
| JP | 2011-028826 A | 2/2011 |
| JP | 2011-134372 A | 7/2011 |
| JP | 2012-043495 A | 3/2012 |
| JP | 2015-127985 A | 7/2015 |
| JP | 2016-110680 A | 6/2016 |
| JP | 2017-139044 A | 8/2017 |
| JP | 2017-168178 A | 9/2017 |
| JP | 2018-133120 A | 8/2018 |
| JP | 6590104 B1 | 10/2019 |

OTHER PUBLICATIONS

U.S. Appl. No. 17/160,535 (the present application), Pending.
U.S. Appl. No. 16/569,103, Allowed.
U.S. Appl. No. 16/777,279, U.S. Pat. No. 10,811,048.
Notice of Allowance dated Aug. 6, 2020 in U.S. Appl. No. 16/777,279.
Office Action dated Jan. 29, 2021 in U.S. Appl. No. 16/569,103.
Office Action dated Apr. 20, 2021 in Japanese Application No. 2019-092448, corresponds to U.S. Appl. No. 16/569,103.
Notice of Allowance dated Apr. 4, 2022 in U.S. Appl. No. 16/569,103.
Notice of Allowance dated Jul. 28, 2022 in U.S. Appl. No. 16/569,103.

* cited by examiner

*Primary Examiner* — Kevin M Bernatz
(74) *Attorney, Agent, or Firm* — Sughrue Mion, PLLC

(57) ABSTRACT

The magnetic tape in which a difference ($S_{0.1}-S_{1.6}$) between a spacing $S_{0.1}$ and a spacing $S_{1.6}$ obtained after n-hexane cleaning on a surface of the magnetic layer is equal to or less than 32 nm. The $S_{0.1}$ is a value obtained as a spacing under a pressing force of 0.1 atm from a relational expression between a pressure and a spacing obtained by performing a spacing measurement on the surface of the magnetic layer by an optical interference method under a pressing force of each of a plurality of different pressures after the n-hexane cleaning, and $S_{1.6}$ is a spacing measured on the surface of the magnetic layer by the optical interference method under the pressing force of 1.6 atm after the n-hexane cleaning.

17 Claims, 2 Drawing Sheets

MAGNETIC TAPE HAVING CHARACTERIZED MAGNETIC LAYER, MAGNETIC TAPE CARTRIDGE, AND MAGNETIC TAPE APPARATUS

CROSS-REFERENCE TO RELATED APPLICATIONS

This application claims priority under 35 U.S.C 119 to Japanese Patent Application No. 2020-015559 filed on Jan. 31, 2020. The above application is hereby expressly incorporated by reference, in its entirety, into the present application.

BACKGROUND OF THE INVENTION

1. Field of the Invention

The present invention relates to a magnetic tape, a magnetic tape cartridge, and a magnetic tape apparatus.

2. Description of the Related Art

There are tape-shaped and disk-shaped magnetic recording medium, and the tape-shaped magnetic recording medium, that is, a magnetic tape is mainly used for data storage applications such as data backup and archive (for example, refer to JP6590104B).

SUMMARY OF THE INVENTION

Recording of data on a magnetic tape is usually performed by running the magnetic tape in a magnetic tape apparatus (usually called "drive") and recording the data on a data band by making a magnetic head follow the data band of the magnetic tape. As a result, a data track is formed in the data band. In addition, in a case where recorded data are reproduced, the data recorded on the data band is read by running the magnetic tape in the magnetic tape apparatus and by making the magnetic head follow the data band of the magnetic tape.

In order to increase the accuracy with which the magnetic head following the data band of the magnetic tape in the recording and/or reproduction as described above, a system (hereinafter, it is described as a "servo system".) for performing head tracking using a servo signal has been put into practical use.

Further, dimension information in the width direction of the running magnetic tape is acquired using the servo signal, and a tension applied in the longitudinal direction of the magnetic tape is adjusted according to the acquired dimension information, thereby controlling the dimension in the width direction of the magnetic tape (refer to, for example, paragraph [0170] in JP6590104B). It is considered that the above-described tension adjustment can contribute to suppressing the occurrence of phenomena such as overwriting of recorded data and defective reproduction in a case where the magnetic head for recording or reproducing data deviates from a target track position due to the width deformation of the magnetic tape during recording or reproduction. Further, in a case of recording and/or reproducing data by running the magnetic tape in the magnetic tape apparatus while performing such tension adjustment, it is expected that the high running stability of the magnetic tape leads to further suppression of the occurrence of the above phenomenon.

In view of the above, an object according to one aspect of the present invention is to provide a magnetic tape having excellent running stability in recording and/or reproduction by controlling the dimension in the width direction of the magnetic tape by adjusting the tension applied in the longitudinal direction of the magnetic tape.

One aspect of the present invention relates to a magnetic tape comprising:

a non-magnetic support; and a magnetic layer containing a ferromagnetic powder, in which a difference, $S_{0.1}-S_{1.6}$, between a spacing $S_{0.1}$ and a spacing $S_{1.6}$ each obtained after n-hexane cleaning on a surface of the magnetic layer is equal to or less than 32 nm, the spacing $S_{0.1}$ is a value obtained as a spacing under the pressing force of 0.1 atm from a relational expression between a pressure and a spacing obtained by performing a spacing measurement on the surface of the magnetic layer by an optical interference method under a pressing force of each of a plurality of different pressures after n-hexane cleaning, and the spacing $S_{1.6}$ is a spacing measured on the surface of the magnetic layer by the optical interference method under a pressing force of 1.6 atm after n-hexane cleaning.

In the following, the above difference $(S_{0.1}-S_{1.6})$ is also simply referred to as "difference". In addition, 1 atm=101325 Pa (Pascal).

In one aspect, the difference may be equal to or less than 30 nm.

In one aspect, the difference may be equal to or more than 10 nm and equal to or less than 30 nm.

In one aspect, the magnetic layer may contain inorganic oxide particles.

In one aspect, the inorganic oxide particles may be composite particles of an inorganic oxide and a polymer.

In one aspect, the magnetic tape may have a non-magnetic layer containing a non-magnetic powder, which is provided between the non-magnetic support and the magnetic layer.

In one aspect, the magnetic tape may have a back coating layer containing a non-magnetic powder on a surface side of the non-magnetic support opposite to a surface side having the magnetic layer.

In one aspect, the magnetic tape may have a thickness of equal to or less than 5.3 μm.

One aspect of the present invention relates to a magnetic tape cartridge comprising the magnetic tape.

One aspect of the present invention relates to a magnetic tape apparatus comprising the magnetic tape cartridge.

According to one aspect of the present invention, it is possible to provide a magnetic tape having excellent running stability in recording and/or reproduction by controlling the dimension in the width direction of the magnetic tape by adjusting the tension applied in the longitudinal direction of the magnetic tape. In addition, according to one aspect of the present invention, it is possible to provide the magnetic tape cartridge including the magnetic tape, and the magnetic tape apparatus including the magnetic tape cartridge.

DESCRIPTION OF THE PREFERRED EMBODIMENTS

Magnetic Tape

Figure 1:
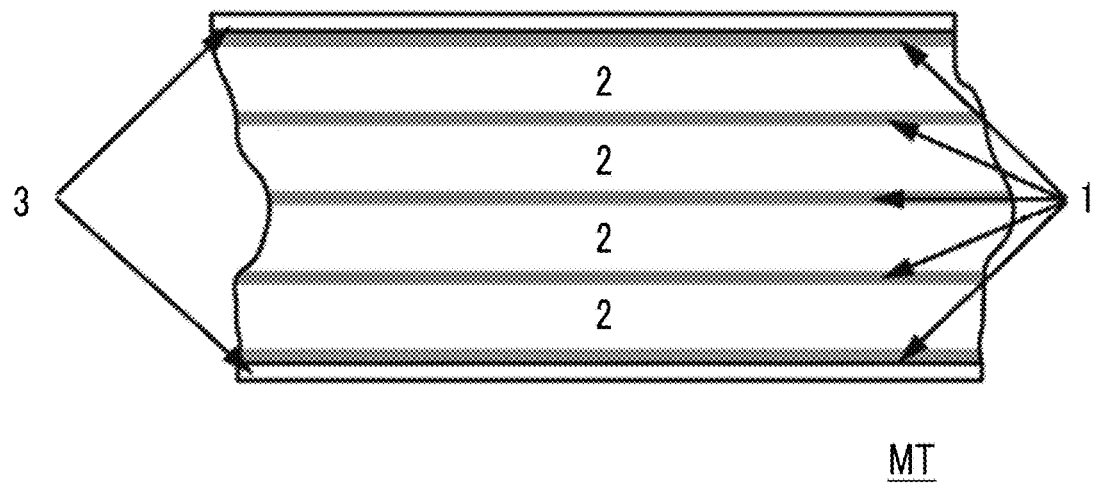
FIG. 1 shows a disposition example of a data band and a servo band.

One aspect of the present invention relates to the magnetic tape having a non-magnetic support and a magnetic layer containing ferromagnetic powder, in which a difference, $S_{0.1}-S_{1.6}$, between a spacing $S_{0.1}$ and a spacing $S_{1.6}$ each obtained after n-hexane cleaning on a surface of the magnetic layer is equal to or less than 32 nm. The spacing $S_{0.1}$ is a value obtained as a spacing under the pressing force of 0.1 atm from a relational expression between a pressure and a spacing obtained by performing a spacing measurement on the surface of the magnetic layer by an optical interference method under a pressing force of each of a plurality of different pressures after n-hexane cleaning. The spacing $S_{1.6}$ is a spacing measured on the surface of the magnetic layer by the optical interference method under a pressing force of 1.6 atm after n-hexane cleaning.

In the present invention and the present specification, the "n-hexane cleaning" means that a sample piece cut out from a magnetic tape is immersed in fresh n-hexane (200 g) having a liquid temperature of 20° C. to 25° C. and ultrasonically cleaned (ultrasonic output: 40 kHz) for 100 seconds. A sample piece having a length of 5 cm is cut out from the magnetic tape to be cleaned and subjected to the n-hexane cleaning. The width of the magnetic tape and the width of the sample piece cut out from the magnetic tape are usually ½ inch. For magnetic tapes other than ½ inch width, a sample piece having a length of 5 cm may be cut out and subjected to the n-hexane cleaning. The measurement of spacing described in detail below is performed after the sample piece after the n-hexane cleaning is left in an environment of a temperature of 23° C. and a relative humidity of 50% for 24 hours.

In the present invention and the present specification, the "surface of the magnetic layer" of the magnetic tape is synonymous with the surface of the magnetic tape on the magnetic layer side.

In the present invention and the present specification, "spacing $S_{0.1}$" and "spacing $S_{1.6}$" are values obtained by the following methods.

In order to obtain the spacing $S_{0.1}$, spacing measurement is performed on the surface of the magnetic layer by an optical interference method under the pressing force of each of a plurality of different pressures after the n-hexane cleaning to obtain a relational expression of the pressure and the spacing. Specifically, the above relational expression is obtained by the following method. The plurality of different pressures described above are 0.5 atm, 0.6 atm, 0.8 atm, 1.0 atm, 1.3 atm, and 1.6 atm.

The magnetic tape (specifically, refer to the sample pieces described above, and the same applies below) and a transparent plate-like member (for example, glass plate and the like) are superposed on each other such that a magnetic layer surface of the magnetic tape faces the transparent plate-like member, and the pressing member is pressed from the side opposite to the magnetic layer side of the magnetic tape by a pressure of 0.5 atm. In this state, the magnetic layer surface of the magnetic tape is irradiated with light via the transparent plate-like member (Irradiated area: 150,000 to 200,000 μm²), and spacing (distance) between the magnetic layer surface of the magnetic tape and the magnetic tape side surface of the transparent plate-like member is obtained on the basis of intensity (for example, contrast of an interference fringe image) of interference light generated by an optical path difference between reflected light from the magnetic layer surface of the magnetic tape and reflected light from the magnetic tape side surface of the transparent plate-like member. The light irradiated here is not particularly limited. In a case where the irradiated light is light having a light emission wavelength over a relatively wide wavelength range such as white light including light of a plurality of wavelengths, a member having a function of selectively cutting light of a specific wavelength such as an interference filter or light other than a specific wavelength region is disposed between the transparent plate-like member and a light receiving portion receiving reflected light, and the light of a part of wavelengths in the reflected light is selectively incident on the light receiving portion. In a case where the light to be irradiated is light having a single emission peak (so-called monochromatic light), the above member may not be used. As an example, the wavelength of the light incident on the light receiving portion can be in the range of, for example, 500 to 700 nm. However, the wavelength of the light incident on the light receiving portion is not limited to the above range. In addition, the transparent plate-like member may be a member having transparency that transmits the irradiated light to the extent that the magnetic tape is irradiated with light via this member and the interference light is obtained.

The interference fringe image obtained by measuring the spacing is divided into 300,000 points to obtain the spacing (the distance between the magnetic layer surface of the magnetic tape and the magnetic tape side surface of the transparent plate-like member) of each point, and this is made to be a histogram, and a mode value in the histogram is made to be the spacing measured under the pressing force of 0.5 atm.

Five sample pieces are cut out from the same magnetic tape, and the spacing is obtained by pressing the pressing member with a pressure of 0.5 atm for each sample piece after the n-hexane cleaning, and by further increasing the pressure, the spacing measured sequentially under the pressing force of 0.6 atm, 0.8 atm, 1.0 atm, 1.3 atm, and 1.6 atm is obtained by the above method.

The spacing value under each pressing force obtained in this way is plotted against the pressure at the time of pressing force, and is fitted to the following Equation 1 by the least squares method, the following Equation 1:

$$h = c1 p^{c2}. \qquad \text{(Equation 1)}$$

In Equation 1, h is the average spacing, p is the pressure at the time of pressing force, c1 and c2 are fitting parameters, and C1 and C2 can be obtained by fitting.

Using C1 and C2 thus obtained, the relational expression between pressure and spacing is derived. That is, in a case where the spacing under the pressing force of pressure p and $S_p$, the relational expression is "$S_p = C1(p)^{C2}$". Accordingly, the spacing $S_{0.1}$ under the pressing force of the pressure 0.1 atm is calculated by the following equation 2, $$S_{0.1} = C1(0.1)^{c2}. \qquad \text{(Equation 2)}$$

For each of the five sample pieces, the derivation of the relational expression and the derived relational expression are used to calculate $S_{0.1}$. The arithmetic average of $S_{0.1}$ calculated for each of the five sample pieces is set to $S_{0.1}$ of the magnetic tape to be measured.

For the spacing $S_{1.6}$, the arithmetic average of the measured values of the spacing obtained by the measurement under the pressing force of 1.6 atm performed for obtaining the above-described relational expression for each of the five sample pieces is set to $S_{1.6}$ of the magnetic tape to be measured.

Then, as a difference between $S_{0.1}$ and $S_{1.6}$ thus obtained, the difference ($S_{0.1}-S_{1.6}$) of the magnetic tape to be measured is obtained.

The above-described measurement of spacing can be performed using, for example, a commercially available tape spacing analyzer (TSA; Tape Spacing Analyzer) such as Tape Spacing Analyzer manufactured by Micro Physics. The measurement of spacing in the Examples is performed using a Tape Spacing Analyzer manufactured by Micro Physics.

In the above magnetic tape, the difference ($S_{0.1}-S_{1.6}$) obtained by the above method is equal to or less than 32 nm. It is supposed by the present inventors that this can contribute to improvement of running stability (hereinafter, it is simply referred to as "running stability".) in a case of recording and/or reproduction by controlling a dimension in the width direction of the magnetic tape by adjusting the tension applied in the longitudinal direction of the magnetic tape. The details are as follows.

In a magnetic tape apparatus which controls the dimension in the width direction of the magnetic tape by adjusting the tension applied in the longitudinal direction of the magnetic tape, the larger the tension is applied in the longitudinal direction of the magnetic tape, the larger the dimension in the width direction of the magnetic tape can be shrunk (that is, the width can be made narrower), and the smaller the tension is, the smaller the degree of the shrunk. By adjusting the tension applied in the longitudinal direction of the magnetic tape in this manner, the dimension in the width direction of the magnetic tape can be controlled.

On the other hand, recording of data on the magnetic tape and reproduction of the recorded data are usually performed by sliding the magnetic layer surface of the magnetic tape in contact with the magnetic head. In a case where the tension adjustment as described above is performed, the tension applied in the longitudinal direction of the magnetic tape may fluctuate. As a result, a contact state between the magnetic tape running in the magnetic tape apparatus and the magnetic head can also fluctuate, so that the pressure applied to the magnetic layer surface due to the contact with the magnetic head can also fluctuate. The magnetic layer surface usually has protrusions, and such protrusions can contribute to lowering a friction coefficient in a case of sliding between the magnetic layer surface and the magnetic head by reducing a portion where the magnetic layer surface contacts (so-called true contact) the magnetic head. However, in a case where the height of such a protrusion is greatly changed by changing the pressure applied to the magnetic layer surface, the contact state between the magnetic layer surface and the magnetic head is greatly changed. In a case where it is possible to suppress the occurrence of such a large change, it is considered that the running stability can be improved. In this regard, it is supposed that the difference between $S_{0.1}$ and $S_{1.6}$ ($S_{0.1}-S_{1.6}$) obtained by the above method is as small as equal to or less than 32 nm, which indicates that a large change in the height of the protrusion on the magnetic layer surface is unlikely to occur even in a case where the pressure applied to the magnetic layer surface changes. It is supposed by the present inventors that this leads to improvement in the running stability.

However, the present invention is not limited to the above supposition. With respect to the pressures for the spacing $S_{0.1}$ and the spacing $S_{1.6}$, in the present invention, 0.1 atm and 1.6 atm are adopted as exemplary values of the pressures, and the pressure applied to the magnetic layer surface of the magnetic tape in a case of sliding with the magnetic head is not limited to the pressure. It has been newly found as a result of the diligent study of the present inventors that by adjusting the tension applied in the longitudinal direction of the magnetic tape, the dimension in the width direction of the magnetic tape can be controlled to improve the running stability in a case of performing recording and/or reproduction by controlling the difference obtained by employing the pressure.

Hereinafter, the magnetic tape will be described later in detail.

Magnetic Layer (Difference ($S_{0.1}-S_{1.6}$))

The difference ($S_{0.1}-S_{1.6}$) of the magnetic tape is equal to or less than 32 nm, preferably equal to or less than 31 nm, more preferably equal to or less than 30 nm, still more preferably equal to or less than 29 nm, still more preferably equal to or less than 28 nm, still more preferably equal to or less than 27 nm, still more preferably equal to or less than 26 nm, still more preferably equal to or less than 25 nm, still more preferably equal to or less than 24 nm, still more preferably equal to or less than 23 nm, and further more preferably equal to or less than 22 nm, from the viewpoint of further improving the running stability. In addition, the difference can be, for example, more than 0 nm, equal to or more than 1 nm, equal to or more than 3 nm, equal to or more than 5 nm, or equal to or more than 10 nm. The smaller the difference is, the more preferable it is from the viewpoint of improving running stability. The difference can be controlled by the type of non-magnetic filler (hereinafter, referred to as "protrusion forming agent") capable of forming protrusions on the magnetic layer surface and the manufacturing conditions of the magnetic tape. Details of this point will be described later.

The $S_{0.1}$ and $S_{1.6}$ of the magnetic tape are not particularly limited as long as the difference ($S_{0.1}-S_{1.6}$) is equal to or less than 32 nm. On the other hand, from the viewpoint of improving the electromagnetic conversion characteristics, the thickness of $S_{0.1}$ is preferably equal to or less than 70 nm, more preferably equal to or less than 60 nm, still more preferably equal to or less than 50 nm, and still more preferably equal to or less than 40 nm. In addition, from the viewpoint of keeping the friction coefficient low mainly at the initial stage of sliding with the magnetic head, $S_{0.1}$ is preferably equal to or more than 10 nm, more preferably equal to or more than 15 nm, still more preferably equal to or more than 20 nm, and still more preferably equal to or more than 25 nm. In addition, the thickness of $S_{1.6}$ is preferably equal to or more than 1 nm, more preferably equal to or more than 3 nm, still more preferably equal to or more than 5 nm, and further more preferably equal to or more than 7 nm. Further, $S_{1.6}$ can be, for example, equal to or less than 30 nm, equal to or less than 25 nm, equal to or less than 20 nm, or equal to or less than 15 nm.

Ferromagnetic Powder

As the ferromagnetic powder contained in the magnetic layer, one or a combination of two or more kinds of ferromagnetic powder known as the ferromagnetic powder used in the magnetic layer of various magnetic recording medium can be used. It is preferable to use ferromagnetic powder having a small average particle size, from a viewpoint of improvement of recording density. In this respect, an average particle size of the ferromagnetic powder is preferably equal to or less than 50 nm, more preferably equal to or less than 45 nm, still more preferably equal to or less than 40 nm, still more preferably equal to or less than 35 nm, still more preferably equal to or less than 30 nm, still more preferably equal to or less than 25 nm, and still more preferably equal to or less than 20 nm. On the other hand, from a viewpoint of magnetization stability, an average particle size of the ferromagnetic powder is preferably equal to or more than 5 nm, more preferably equal to or more than 8 nm, still more preferably equal to or more than 10 nm, and still more preferably equal to or more than 15 nm, and still more preferably equal to or more than 20 nm.

Hexagonal Ferrite Powder

Preferred specific examples of the ferromagnetic powder may include a hexagonal ferrite powder. For details of the hexagonal ferrite powder, descriptions disclosed in paragraphs [0012] to [0030] of JP2011-225417A, paragraphs [0134] to [0136] of JP2011-216149A, paragraphs [0013] to [0030] of JP2012-204726A, and paragraphs [0029] to [0087] of JP2015-127985A can be referred to, for example.

In the present invention and the present specification, the "hexagonal ferrite powder" refers to the ferromagnetic powder in which a hexagonal ferrite type crystal structure is detected as a main phase by an X-ray diffraction analysis. The main phase refers to a structure to which the highest intensity diffraction peak in an X-ray diffraction spectrum obtained by the X-ray diffraction analysis is attributed. For example, in a case where the highest intensity diffraction peak is attributed to the hexagonal ferrite type crystal structure in an X-ray diffraction spectrum obtained by X-ray diffraction analysis, it is determined that the hexagonal ferrite type crystal structure is detected as the main phase. In a case where only a single structure is detected by the X-ray diffraction analysis, this detected structure is taken as the main phase. The hexagonal ferrite type crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and the present specification, the hexagonal strontium ferrite powder means that a main divalent metal atom contained in the powder is a strontium atom, and hexagonal barium ferrite powder means that a main divalent metal atom included in the powder is a barium atom. The main divalent metal atom refers to a divalent metal atom that occupies the most on an at % basis among divalent metal atoms included in the powder. Here, a rare earth atom is not included in the above divalent metal atom. The "rare earth atom" in the present invention and the present specification is selected from the group consisting of a scandium atom (Sc), a yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), a ytterbium atom (Yb), and a lutetium atom (Lu).

Hereinafter, the hexagonal strontium ferrite powder which is one aspect of the hexagonal ferrite powder will be described in more detail.

An activation volume of the hexagonal strontium ferrite powder is preferably in a range of 800 to 1600 $nm^3$. The fine particulate hexagonal strontium ferrite powder exhibiting an activation volume in the above range is suitable for producing a magnetic tape exhibiting excellent electromagnetic conversion characteristics. An activation volume of the hexagonal strontium ferrite powder is preferably equal to or more than 800 $nm^3$, and may be, for example, equal to or more than 850 $nm^3$. Further, from a viewpoint of further improving electromagnetic conversion characteristics, an activation volume of the hexagonal strontium ferrite powder is more preferably equal to or less than 1500 $nm^3$, still more preferably equal to or less than 1400 $nm^3$, still more preferably equal to or less than 1300 $nm^3$, still more preferably equal to or less than 1200 $nm^3$, and still more preferably equal to or less than 1100 $nm^3$. The same applies to an activation volume of the hexagonal barium ferrite powder.

The "activation volume" is a unit of magnetization reversal and is an index indicating a magnetic size of a particle. An activation volume described in the present invention and the present specification and an anisotropy constant Ku which will be described later are values obtained from the following relational expression between a coercivity Hc and an activation volume V, by performing measurement in a Hc measurement portion at a magnetic field sweep rate of 3 minutes and 30 minutes using a vibrating sample magnetometer (measurement temperature: 23° C.±1° C.). It should be noted that in a unit of the anisotropy constant Ku, 1 erg/cc=$1.0\times10^{-1}$ $J/m^3$.

$$Hc=2Ku/Ms\{1-[(kT/KuV)\ln(At/0.693)]^{1/2}\}$$

[In the Expression, Ku: anisotropy constant (unit: $J/m^3$), Ms: saturation magnetization (unit: kA/m), k: Boltzmann constant, T: absolute temperature (unit: K), V: activation volume (unit: $cm^3$), A: spin precession frequency (unit: $s^{-1}$), t: magnetic field reversal time (unit: s)]

An index for reducing thermal fluctuation, in other words, improving thermal stability can include the anisotropy constant Ku. The hexagonal strontium ferrite powder may preferably have Ku of equal to or more than $1.8\times10^5$ $J/m^3$, and more preferably have a Ku of equal to or more than $2.0\times10^5$ $J/m^3$. In addition, Ku of the hexagonal strontium ferrite powder may be, for example, equal to or less than $2.5\times10^5$ $J/m^3$. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In one aspect, the hexagonal strontium ferrite powder containing rare earth atoms may have an uneven distribution property of a rare earth atom surface layer portion. In the present invention and the present specification, the "rare earth atom surface layer portion uneven distribution property" means that a rare earth atom content with respect to 100 at % of an iron atom in a solution obtained by partially dissolving the hexagonal strontium ferrite powder with an acid (hereinafter, referred to as a "rare earth atom surface layer portion content" or simply a "surface layer portion content" for a rare earth atom) and a rare earth atom content with respect to 100 at % of an iron atom in a solution obtained by totally dissolving the hexagonal strontium ferrite powder with an acid (hereinafter, referred to as a "rare earth atom bulk content" or simply a "bulk content" for a rare earth atom) satisfy a ratio of a rare earth atom surface layer portion content/a rare earth atom bulk content>1.0.

A rare earth atom content in the hexagonal strontium ferrite powder which will be described later is the same meaning as the rare earth atom bulk content. On the other hand, partial dissolution using an acid dissolves a surface layer portion of a particle configuring the hexagonal strontium ferrite powder, and thus, a rare earth atom content in a solution obtained by partial dissolution is a rare earth atom content in a surface layer portion of a particle configuring the hexagonal strontium ferrite powder. A rare earth atom surface layer portion content satisfying a ratio of "rare earth atom surface layer portion content/rare earth atom bulk content>1.0" means that in a particle of the hexagonal strontium ferrite powder, rare earth atoms are unevenly distributed in a surface layer portion (that is, more than an inside). The surface layer portion in the present invention and the present specification means a partial region from a surface of a particle configuring the hexagonal strontium ferrite powder toward an inside.

In a case where the hexagonal strontium ferrite powder includes a rare earth atom, a rare earth atom content (bulk content) is preferably in a range of 0.5 to 5.0 at % with respect to 100 at % of an iron atom. It is considered that a bulk content in the above range of the included rare earth atom and uneven distribution of the rare earth atoms in a surface layer portion of a particle configuring the hexagonal strontium ferrite powder contribute to suppression of a decrease in a reproducing output in repeated reproduction. It is supposed that this is because the hexagonal strontium ferrite powder includes a rare earth atom with a bulk content in the above range, and rare earth atoms are unevenly distributed in a surface layer portion of a particle configuring the hexagonal strontium ferrite powder, and thus it is possible to increase an anisotropy constant Ku. The higher a value of an anisotropy constant Ku is, the more a phenomenon called so-called thermal fluctuation can be suppressed (in other words, thermal stability can be improved). By suppressing occurrence of thermal fluctuation, it is possible to suppress a decrease in reproducing output during repeated reproduction. It is supposed that uneven distribution of rare earth atoms in a particulate surface layer portion of the hexagonal strontium ferrite powder contributes to the stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to suppress the magnetic layer surface from being scraped by being slid with respect to the magnetic head. That is, it is supposed that the hexagonal strontium ferrite powder having rare earth atom surface layer portion uneven distribution property can also contribute to an improvement of running durability of the magnetic tape. It is supposed that this may be because uneven distribution of rare earth atoms on a surface of a particle configuring the hexagonal strontium ferrite powder contributes to an improvement of interaction between the particle surface and an organic substance (for example, a binding agent and/or an additive) included in the magnetic layer, and, as a result, an intensity of the magnetic layer is improved.

From a viewpoint of further suppressing a decrease in reproducing output during repeated reproduction and/or a viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and the present specification, unless otherwise noted, the content of an atom means a bulk content obtained by totally dissolving the hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more kinds of rare earth atoms is obtained for the total of two or more kinds of rare earth atoms. This also applies to other components in the present invention and the present specification. That is, unless otherwise noted, a certain component may be used one or in the combination of two or more. A content amount or content in the case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further suppressing a decrease in reproducing output in repeated reproduction, there are a neodymium atom, a samarium atom, a yttrium atom, and a dysprosium atom, here, a neodymium atom, a samarium atom, and a yttrium atom are more preferable, and a neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be equal to or more than 1.5. A "surface layer portion content/bulk content" larger than 1.0 means that in a particle configuring the hexagonal strontium ferrite powder, rare earth atoms are unevenly distributed in the surface layer portion (that is, more than the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, equal to or less than 10.0, equal to or less than 9.0, equal to or less than 8.0, equal to or less than 7.0, equal to or less than 6.0, equal to or less than 5.0, or equal to or less than 4.0. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and the "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic tape, a part of the hexagonal strontium ferrite powder taken out from the magnetic layer is subjected to partial dissolution, and the other part is subjected to total dissolution. The hexagonal strontium ferrite powder can be taken out from the magnetic layer by a method disclosed in a paragraph [0032] of JP2015-091747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10% to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 mL of 1 mol/L hydrochloric acid is held on a hot plate at a set temperature of 70° C. for 1 hour. The obtained solution is filtered by a membrane filter of 0.1 μm. Elemental analysis of the obtained filtrate is performed by an inductively coupled plasma (ICP) analyzer. In this way, the surface layer portion content of a rare earth atom with respect to 100 at % of an iron atom may be obtained. In a case where a plurality of kinds of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 mL of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom may be obtained.

From a viewpoint of increasing the reproducing output in a case of reproducing data recorded on the magnetic tape, it is desirable that mass magnetization σs of the ferromagnetic powder included in the magnetic tape is high. In this regard, the hexagonal strontium ferrite powder including a rare earth atom but not having the rare earth atom surface layer portion uneven distribution property tends to have as largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In one aspect, σs of the hexagonal strontium ferrite powder may be equal to or more than 45 A·m²/kg, and may be equal to or more than 47 A·m²/kg. On the other hand, from a viewpoint of noise reduction, σs is preferably equal to or less than 80 A·m²/kg and more preferably equal to or less than 60 A·m²/kg. σs can be measured using a known measuring apparatus, such as a vibrating sample magnetometer, capable of measuring magnetic characteristics. In the present invention and the present specification, unless otherwise noted, the mass magnetization σs is a value measured at a magnetic field intensity of 15 kOe. 1 [kOe]=$10^6/4\pi$ [A/m].

Regarding the content (bulk content) of a constituent atom of the hexagonal strontium ferrite powder, the strontium atom content may be, for example, in a range of 2.0 to 15.0 at % with respect to 100 at % of an iron atom. In one aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder may be, for example, in a range of 0.05 to 5.0 at % with respect to 100 at % of an iron atom, respectively.

As a crystal structure of hexagonal ferrite, a magnetoplumbite type (also referred to as an "M-type"), a W-type, a Y-type, and a Z-type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to one aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) occupies for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, or an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom may be, for example, 0.5 to 10.0 at % with respect to 100 at % of an iron atom. From a viewpoint of further suppressing a decrease in reproducing output in repeated reproduction, the hexagonal strontium ferrite powder includes an iron atom, a strontium atom, an oxygen atom, and a rare earth atom, and the content of atoms other than these atoms is preferably equal to or less than 10.0 at %, more preferably in a range of 0 to 5.0 at %, and may be 0 at % with respect to 100 at % of an iron atom. That is, in one aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and the present specification, "not include" for a certain atom means that a content measured by an ICP analyzer after total dissolution is 0 mass %. A detection limit of the ICP analyzer is usually equal to or less than 0.01 ppm (parts per million) on a mass basis. The "not included" is used as a meaning including that an atom is included in an amount less than the detection limit of the ICP analyzer. In one aspect, the hexagonal strontium ferrite powder may not include a bismuth atom (Bi).

Metal Powder

As a preferred specific example of the ferromagnetic powder, a ferromagnetic metal powder can also be used. For details of the ferromagnetic metal powder, descriptions disclosed in paragraphs [0137] to [0141] of JP2011-216149A and paragraphs [0009] to [0023] of JP2005-251351A can be referred to, for example.

ε-Iron Oxide Powder

As a preferred specific example of the ferromagnetic powder, ε-iron oxide powder can also be used. In the present invention and the present specification, "ε-iron oxide powder" refers to ferromagnetic powder in which an ε-iron oxide type crystal structure is detected as a main phase by X-ray diffraction analysis. For example, in a case where the highest intensity diffraction peak is attributed to an ε-iron oxide type crystal structure in an X-ray diffraction spectrum obtained by X-ray diffraction analysis, it is determined that the ε-iron oxide type crystal structure is detected as the main phase. As a manufacturing method of ε-iron oxide powder, a producing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. 5280 to 5284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic tape is not limited to the methods described here.

An activation volume of the ε-iron oxide powder is preferably in a range of 300 to 1500 $nm^3$. The fine particulate ε-iron oxide powder exhibiting an activation volume in the above range is suitable for producing a magnetic tape exhibiting excellent electromagnetic conversion characteristics. An activation volume of the ε-iron oxide powder is preferably equal to or more than 300 $nm^3$, and may be, for example, equal to or more than 500 $nm^3$. Further, from a viewpoint of further improving electromagnetic conversion characteristics, an activation volume of the ε-iron oxide powder is more preferably equal to or less than 1400 $nm^3$, still more preferably equal to or less than 1300 $nm^3$, still more preferably equal to or less than 1200 $nm^3$, and still more preferably equal to or less than 1100 $nm^3$.

An index for reducing thermal fluctuation, in other words, improving thermal stability can include the anisotropy constant Ku. The ε-iron oxide powder preferably may have Ku of equal to or more than $3.0 \times 10^4$ $J/m^3$, and more preferably may have Ku of equal to or more than $8.0 \times 10^4$ $J/m^3$. Ku of the ε-iron oxide powder may be, for example, equal to or less than $3.0 \times 10^5$ $J/m^3$. Here, it means that the higher Ku is, the higher thermal stability is, this is preferable, and thus, a value thereof is not limited to the values exemplified above.

From a viewpoint of increasing the reproducing output in a case of reproducing data recorded on the magnetic tape, it is desirable that mass magnetization σs of the ferromagnetic powder included in the magnetic tape is high. In this regard, in one aspect, σs of the ε-iron oxide powder may be equal to or more than 8 $A \cdot m^2/kg$, and may be equal to or more than 12 $A \cdot m^2/kg$. On the other hand, from a viewpoint of noise reduction, σs of the ε-iron oxide powder is preferably equal to or less than 40 $A \cdot m^2/kg$ and more preferably equal to or less than 35 $A \cdot m^2/kg$.

In the present invention and the present specification, unless otherwise noted, an average particle size of various powders such as the ferromagnetic powder is a value measured by the following method using a transmission electron microscope.

The powder is imaged at a magnification ratio of 100,000 with a transmission electron microscope, and the image is printed on printing paper so that the total magnification ratio becomes 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by known image analysis software, for example, image analysis software KS-400 manufactured by Carl Zeiss Co., Ltd. The average particle size shown in Examples which will be described later is a value measured by using a transmission electron microscope H-9000 manufactured by Hitachi, Ltd. as the transmission electron microscope, and image analysis software KS-400 manufactured by Carl Zeiss Co., Ltd. as the image analysis software, unless otherwise noted. In the present invention and the present specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is sandwiched between the particles. The term "particle" is used for representing a powder in some cases.

As a method of taking sample powder from the magnetic tape in order to measure the particle size, a method disclosed in a paragraph [0015] of JP2011-048878A can be used, for example.

In the present invention and the present specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average needle-like ratio of the powder, a short axis length of the particles, that is, a length of a short axis is measured in the measurement described above, a value (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of the definition of the particle size (1), the average particle size is an average long axis length, and in a case of the definition (2), the average particle size is an average plate diameter. In a case of the definition (3), the average particle size is an average diameter (also referred to as an average particle diameter).

A content amount (filling percentage) of the ferromagnetic powder of the magnetic layer is preferably in a range of 50% to 90 mass % and more preferably in a range of 60% to 90 mass %. A high filling percentage of the ferromagnetic powder in the magnetic layer is preferable from a viewpoint of improvement of recording density.

Binding Agent

The magnetic tape can be a coating type magnetic tape, and include the binding agent in the magnetic layer. The binding agent is one or more kinds of resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, methyl methacrylate, or the like, a cellulose resin such as nitrocellulose, an epoxy resin, a phenoxy resin, and a polyvinylalkylal resin such as polyvinyl acetal or polyvinyl butyral can be used alone or a plurality of the resins can be mixed with each other to be used. Among these, a polyurethane resin, an acrylic resin, a cellulose resin, and a vinyl chloride resin are preferable. These resins may be homopolymers or copolymers. These resins can be used as the binding agent even in the non-magnetic layer and/or a back coating layer which will be described later. For the binding agent described above, descriptions disclosed in paragraphs [0028] to [0031] of JP2010-024113A can be referred to. In addition, the binding agent may be a radiation curable resin such as an electron beam curable resin. For the radiation curable resin, paragraphs [0044] to [0045] of JP2011-048878A can be referred to.

An average molecular weight of the resin used as the binding agent can be, for example, equal to or more than 10,000 and equal to or less than 200,000 as a weight-average molecular weight. The weight-average molecular weight of the present invention and the present specification is, by gel permeation chromatography (GPC), a value obtained by performing polystyrene conversion of a value measured under the following measurement conditions. The weight-average molecular weight of the binding agent shown in Examples which will be described later is a value obtained by performing polystyrene conversion of a value measured under the following measurement conditions. The binding agent can be used in an amount of, for example, 1.0 to 30.0 parts by mass with respect to 100.0 parts by mass of the ferromagnetic powder.

GPC apparatus: HLC-8120 (manufactured by Tosoh Corporation)

Column: TSKgel Multipore HXL-M (manufactured by Tosoh Corporation, 7.8 mm inner diameter (ID)×30.0 cm)

Eluent: Tetrahydrofuran (THF)

Curing Agent

A curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent can be included in the magnetic layer in a state of being reacted (crosslinked) with other components such as the binding agent, by proceeding the curing reaction in a manufacturing step of the magnetic tape. The preferred curing agent is a thermosetting compound, and polyisocyanate is suitable for this. For details of the polyisocyanate, descriptions disclosed in paragraphs [0124] and [0125] of JP2011-216149A can be referred to. The curing agent can be used in a composition for forming the magnetic layer in an amount of, for example, 0 to 80.0 parts by mass, and preferably 50.0 to 80.0 parts by mass, from a viewpoint of improving the intensity of each layer such as the magnetic layer, with respect to 100.0 parts by mass of the binding agent.

Other Components

The magnetic layer may include, as necessary, one or more additives. As the additives, a commercially available product can be suitably selected and used according to the desired properties. Alternatively, a compound synthesized by a known method can be used as an additive. As an example of the additive, the curing agent described above can be used. In addition, examples of additives that can be included in the magnetic layer include non-magnetic filler such as non-magnetic fillers, lubricants, dispersing agents, dispersion aids, fungicides, antistatic agents, antioxidants, and the like. The non-magnetic filler is synonymous with non-magnetic particle or non-magnetic powder. Examples of the non-magnetic filler include a protrusion forming agent and a non-magnetic filler capable of functioning as an abrasive (hereinafter, referred to as "abrasive"). Further, as the additive, known additives such as various polymers described in paragraphs [0030] to [0080] of JP2016-051493A can also be used.

As the protrusion forming agent which is one aspect of the non-magnetic filler, particles of an inorganic substance can be used, particles of an organic substance can be used, and composite particles of an inorganic substance and an organic substance can also be used. Examples of the inorganic substance include inorganic oxides such as metal oxides, metal carbonates, metal sulfates, metal nitrides, metal carbides, metal sulfides, and the like, and inorganic oxides are preferable. In one aspect, the protrusion forming agent can be the inorganic oxide particles. Here, the "inorganic oxide particles" mean particles "including inorganic oxide". One aspect of the inorganic oxide particles is particles consisting of an inorganic oxide. Another aspect of the inorganic oxide particles is a composite particle of an inorganic oxide and an organic substance, and specific examples thereof include a composite particle of an inorganic oxide and a polymer. Examples of such particles can include particles in which a polymer is bonded to the surface of inorganic oxide particles.

The above $S_{0.1}$ can be controlled mainly by the particle size of the protrusion forming agent. The average particle size of the protrusion forming agent can be, for example, 30 to 300 nm, preferably 40 to 200 nm. In addition, $S_{0.1}$ can be mainly controlled by the manufacturing conditions of the magnetic tape. On the other hand, $S_{1.6}$ can be controlled by the shape of the protrusion forming agent in addition to the particle size of the protrusion forming agent. The closer the shape of the particle is to a true sphere, the smaller a pushing resistance that acts in a case where a large pressure is applied, so that it is easier to be pushed into the magnetic layer, and $S_{1.6}$ tends to be smaller. On the other hand, in a case where the shape of the particles is a shape apart from the true sphere, for example, a shape called a deformed shape, a large pushing resistance tends to act in a case where a large pressure is applied, so that the particles are less likely to be pushed into the magnetic layer, and the size of $S_{1.6}$ tends to increase. In addition, even the particles whose surface is inhomogeneous and whose surface smoothness is low tend to have the large pushing resistance in a case where a large pressure is applied, so that the particles are less likely to be pushed into the magnetic layer, and the size of $S_{1.6}$ tends to increase. Then, by controlling $S_{0.1}$ and $S_{1.6}$, the difference ($S_{0.1}-S_{1.6}$) can be reduced to equal to or less than 32 nm.

The abrasive, which is another aspect of the non-magnetic filler, is preferably a non-magnetic powder having a Mohs hardness of more than 8, and more preferably a non-magnetic powder having a Mohs hardness of equal to or more than 9. On the other hand, the Mohs hardness of the protrusion forming agent can be, for example, equal to or less than 8 or 7. It should be noted that the maximum value of Mohs hardness is 10 for diamond. Specifically, the abrasives include alumina ($Al_2O_3$), silicon carbide, boron carbide ($B_4C$), $SiO_2$, TiC, chromium oxide ($Cr_2O_3$), cerium oxide, and zirconium oxide ($ZrO_2$), powders such as iron oxide and diamond can be mentioned, and among them, alumina powder such as α-alumina and silicon carbide powder are preferable. In addition, the average particle size of the abrasive can be, for example, in the range of 30 to 300 nm, preferably in the range of 50 to 200 nm.

In addition, from the viewpoint that the protrusion forming agent and the abrasive can exhibit their functions more effectively, the content amount of the protrusion forming agent in the magnetic layer is preferably 0.1 to 5.0 parts by mass and more preferably 0.3 to 3.5 parts by mass with respect to 100.0 parts by mass of the ferromagnetic powder. On the other hand, the content amount of the abrasive in the magnetic layer is preferably 1.0 to 20.0 parts by mass, more preferably 3.0 to 15.0 parts by mass, and further preferably 4.0 to 10.0 parts by mass with respect to 100.0 parts by mass of the ferromagnetic powder.

As an example of the additive which can be used for the magnetic layer containing the abrasive, the dispersing agents described in paragraphs [0012] to [0022] of JP2013-131285A, can be mentioned as a dispersant for improving the dispersibility of the abrasive in the composition for forming the magnetic layer. For the dispersing agent, the reference can be made to paragraphs [0061] and [0071] of JP2012-133837A. The dispersing agent may be contained in the non-magnetic layer. For the dispersing agent that can be contained in the non-magnetic layer, paragraph [0061] of JP2012-133837A can be referred to.

One or more lubricants selected from the group consisting of a fatty acid, a fatty acid ester, and a fatty acid amide can be mentioned as one aspect of the additives contained in the magnetic layer. The above $S_{0.1}$ and $S_{1.6}$ are values obtained by performing the spacing measurement on the magnetic layer surface after the n-hexane cleaning. In a case where a liquid film of the lubricant is present on the magnetic layer surface pressed during the spacing measurement, the measured spacing becomes narrower by the thickness of the liquid film. On the other hand, it is supposed that the lubricant that may present as the liquid film at the time of pressing force can be removed by the n-hexane cleaning. Therefore, by measuring the spacing after the n-hexane cleaning, it is considered that the spacing value can be obtained as a value that corresponds well with the existence state (height of the protrusions) of the protrusions on the magnetic layer surface.

Examples of the fatty acid include lauric acid, myristic acid, palmitic acid, stearic acid, oleic acid, linoleic acid, linolenic acid, behenic acid, erucic acid, elaidic acid, and the like, and stearic acid, myristic acid, and palmitic acid are preferable, and stearic acid is more preferable. The fatty acid may be contained in the magnetic layer in the form of a salt such as a metal salt.

Examples of the fatty acid ester include esters such as lauric acid, myristic acid, palmitic acid, stearic acid, oleic acid, linoleic acid, linolenic acid, behenic acid, erucic acid, and elaidic acid. Specific examples include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, butoxyethyl stearate, and the like.

Examples of the fatty acid amide include amides of the above-described various fatty acids, such as lauric acid amide, myristic acid amide, palmitic acid amide, and stearic acid amide.

For fatty acids and fatty acid derivatives (amides, esters, and the like), the fatty acid-derived sites of the fatty acid derivatives preferably have a structure same to or similar to that of the fatty acid used in combination. For example, in a case where the stearic acid is used as the fatty acid, it is preferable to use stearic acid ester and/or stearic acid amide.

The content amount of the fatty acid in the magnetic layer per 100.0 parts by mass of the ferromagnetic powder is, for example, 0 to 10.0 parts by mass, preferably 0.1 to 10.0 parts by mass, and more preferably 1.0 to 7.0 parts by mass. The content amount of the fatty acid ester in the magnetic layer per 100.0 parts by mass of the ferromagnetic powder is, for example, 0 to 10.0 parts by mass, preferably 0.1 to 10.0 parts by mass, and more preferably 1.0 to 7.0 parts by mass. The content amount of the fatty acid amide in the magnetic layer per 100.0 parts by mass of the ferromagnetic powder is, for example, 0 to 3.0 parts by mass, preferably 0 to 2.0 parts by mass, and more preferably 0 to 1.0 parts by mass.

In addition, in a case where the magnetic tape has a non-magnetic layer between the non-magnetic support and the magnetic layer, the fatty acid content amount of the non-magnetic layer per 100.0 parts by mass of the non-magnetic powder is, for example, 0 to 10.0 parts by mass, preferably 1.0 to 10.0 parts by mass, and more preferably 1.0 to 7.0 parts by mass. The content amount of the fatty acid ester in the non-magnetic layer per 100.0 parts by mass of the non-magnetic powder is, for example, 0 to 15.0 parts by mass, and preferably 0.1 to 10.0 parts by mass. The content amount of the fatty acid amide in the non-magnetic layer per 100.0 parts by mass of the non-magnetic powder is, for example, 0 to 3.0 parts by mass, and preferably 0 to 1.0 parts by mass.

Non-Magnetic Layer

Next, the non-magnetic layer will be described. The magnetic tape may have the magnetic layer directly on the non-magnetic support, or the non-magnetic layer containing the non-magnetic powder between the non-magnetic support and the magnetic layer. The non-magnetic powder used for the non-magnetic layer may be an inorganic substance powder (inorganic powder) or an organic substance powder (organic powder). In addition, carbon black and the like can be used. Examples of the inorganic substance include metal, metal oxide, metal carbonate, metal sulfate, metal nitride, metal carbide, and metal sulfide. These non-magnetic powders can be purchased as a commercially available product or can be manufactured by a known method. For details thereof, the reference can be made to paragraphs [0146] to [0150] of JP2011-216149A. For carbon black which can be used in the non-magnetic layer, the reference can be made to paragraphs [0040] and [0041] of JP2010-024113A. The content amount (filling percentage) of the non-magnetic powder of the non-magnetic layer is preferably in a range of 50% to 90 mass % and more preferably in a range of 60% to 90 mass %.

The non-magnetic layer can include the binding agent and can also include the additive. With respect to other details of the binding agent or the additive of the non-magnetic layer, the well-known technique regarding the non-magnetic layer can be applied. In addition, in regards to the type and the content amount of the binding agent, and the type and the content amount of the additive, for example, the well-known technique regarding the magnetic layer can be applied.

The non-magnetic layer of the magnetic tape also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 7.96 kA/m (100 Oe), or a layer having a residual magnetic flux density equal to or smaller than 10 mT and a coercivity equal to or smaller than 7.96 kA/m (100 Oe). It is preferable that the non-magnetic layer does not have a residual magnetic flux density and a coercivity.

Non-Magnetic Support

Next, the non-magnetic support will be described. As the non-magnetic support (hereinafter, also simply referred to as a "support"), known components such as polyethylene terephthalate, polyethylene naphthalate, polyamide, polyamide imide, and aromatic polyamide subjected to biaxial stretching are used. Among these, polyethylene terephthalate, and polyethylene naphthalate, and polyamide are preferable. These supports may be subjected to corona discharge, plasma treatment, easy adhesion treatment, heat treatment, and the like in advance.

Back Coating Layer

The tape may or may not have the back coating layer containing the non-magnetic powder on a surface side opposite to a surface side of the non-magnetic support having the magnetic layer. Preferably, the back coating layer contains one or both of carbon black and inorganic powder. The back coating layer can include the binding agent and can also include the additive. With respect to details of the binding agent and the additive of the back coating layer, the well-known technique regarding the back coating layer can be applied, and the well-known technique regarding the magnetic layer and/or the non-magnetic layer can be applied. For example, for the back coating layer, the reference can be made to paragraphs [0018] to [0020] of JP2006-331625A and page 4, line 65, to page 5, line 38, of U.S. Pat. No. 7,029,774B.

Various Thicknesses

In regards to the thickness (total thickness) of the magnetic tape, it is required to increase the recording capacity (higher capacity) of the magnetic tape with the enormous increase in the amount of information in recent years. As a unit for increasing the recording capacity, it is possible to reduce the thickness of the magnetic tape and increase the length of the magnetic tape accommodated in one roll of the magnetic tape cartridge. From this point of view, the thickness (total thickness) of the magnetic tape is preferably equal to or less than 5.6 μm, more preferably equal to or less than 5.5 μm, still more preferably equal to or less than 5.4 μm, and further more preferably equal to or less than 5.3 μm. In addition, from the viewpoint of easy handling, the thickness of the magnetic tape is preferably equal to or more than 3.0 μm, more preferably equal to or more than 3.5 μm.

The thickness (total thickness) of the magnetic tape can be measured by the following method.

Ten tape samples (for example, 5 to 10 cm in length) are cut out from a random part of the magnetic tape, and the tape samples are stacked to measure the thickness. A value (thickness per one tape sample) obtained by dividing the measured thickness by 1/10 is defined as the tape thickness. The thickness measurement can be performed using a known measuring device capable of measuring the thickness on the order of 0.1 μm.

The thickness of the non-magnetic support is preferably 3.0 to 5.0 μm.

The thickness of the magnetic layer can be optimized according to the amount of saturation magnetization of the magnetic head used, a head gap length, a band of a recording signal, and the like, and is generally 0.01 μm to 0.15 μm, preferably 0.02 μm to 0.12 μm, and more preferably 0.03 μm to 0.1 μm from the viewpoint of high-density recording. The magnetic layer may be at least a single layer, the magnetic layer may be separated into two or more layers having different magnetic characteristics, and a configuration in regards to a known multilayered magnetic layer can be applied as the magnetic layer. A thickness of the magnetic layer in a case where the magnetic layer is separated into two or more layers is defined as a total thickness of the layers.

The thickness of the non-magnetic layer is, for example, 0.1 to 1.5 μm, preferably 0.1 to 1.0 μm.

A thickness of the back coating layer is preferably equal to or less than 0.9 μm, and more preferably 0.1 to 0.7 μm.

Various thicknesses such as the thickness of the magnetic layer can be obtained by the following method.

After exposing the cross section in the thickness direction of the magnetic tape with an ion beam, the cross section in the exposed cross section is observed with a scanning electron microscope. Various thicknesses can be obtained as an arithmetic average of thicknesses obtained at two randomly points in cross section observation. Alternatively, the various thicknesses can be obtained as a design thicknesses calculated from manufacturing conditions and the like.

Manufacturing Method

Preparation of Composition for Forming Each Layer

The composition for forming the magnetic layer, the non-magnetic layer or the back coating layer usually contains a solvent together with the various components described above. As the solvent, various organic solvents generally used for manufacturing a coating type magnetic recording medium can be used. Among them, from the viewpoint of solubility of the binding agent usually used for a coating type magnetic recording medium, the composition for forming each layer preferably contains one or more kinds of ketone solvents such as acetone, methyl ethyl ketone, methyl isobutyl ketone, diisobutyl ketone, cyclohexanone, isophorone, and tetrahydrofuran. The solvent amount in the composition for forming each layer is not particularly limited, and can be the same as that of the composition for forming each layer of a normal coating type magnetic recording medium. In addition, a step of preparing the composition for forming each layer can generally include at least a kneading step, a dispersing step, or a mixing step provided before and after these steps as necessary. Each step may be divided into two or more stages. The component used in the preparation of the composition for forming each layer may be added at an initial stage or in a middle stage of each step. In addition, each component may be divided and added in two or more steps. For example, a binding agent may be divided and added in a kneading step, a dispersing step, and a mixing step for adjusting viscosity after the dispersion. In the manufacturing step of the magnetic tape, a conventional known manufacturing technique can be used in some or all of the steps. In the kneading step, it is preferable to use a kneader having a strong kneading force such as an open kneader, a continuous kneader, a pressure kneader, or an extruder. Details of these kneading treatments are described in JP1989-106338A (JP-H01-106338A) and JP1989-079274A (JP-H01-079274A). In addition, glass beads and/or other beads can be used to disperse the composition for forming each layer. As such dispersed beads, zirconia beads, titania beads, and steel beads, which are dispersed beads having a high specific gravity, are suitable. It is preferable to use these dispersed beads by optimizing the particle diameter (bead diameter) and the filling percentage. As a dispersing device, a known dispersing device can be used. Composition for forming each layer may be filtered by a known method before being subjected to the coating step. The filtering can be performed by using a filter, for example. As a filter used in the filtering, a filter having a pore diameter of 0.01 to 3 μm (for example, a filter made of glass fiber or a filter made of polypropylene) can be used, for example.

Coating Step

The magnetic layer can be formed, for example, by directly coating the composition for forming the magnetic layer on the surface of the non-magnetic support or performing multilayer coating of the magnetic layer forming composition with the composition for forming the non-magnetic layer in order or at the same time. In the aspect of performing the orientation treatment, the coating layer is oriented in the orientation zone while the coating layer of the composition for forming the magnetic layer is in a wet state. With respect to the orientation treatment, the various well-known techniques such as a description disclosed in a paragraph [0052] of JP2010-024113A can be applied. For example, a vertical orientation treatment can be performed by a known method such as a method using a polar opposing magnet. In the orientation zone, a drying speed of the coating layer can be controlled depending on a temperature and a flow rate of dry air and/or a transportation speed in the orientation zone. In addition, the coating layer may be preliminarily dried before the transportation to the orientation zone.

The back coating layer can be formed by applying the composition for forming the back coating layer to a side opposite to a side having the magnetic layer of the non-magnetic support (or the magnetic layer is provided later). With respect to details of the coating for forming each layer, the reference can be made to a paragraph [0066] of JP2010-231843A.

Other Steps

After performing the above-described coating step, a calender treatment is usually performed to improve the surface smoothness of the magnetic tape. The higher the calender condition is strengthened, the lower the height of the protrusion on the magnetic layer surface formed by the protrusion forming agent in the magnetic tape to be manufactured. Thereby, for example, $S_{0.1}$ can be reduced. Examples of the calender conditions include the type and number of stages of a calender roll, calender pressure, calender temperature (surface temperature of the calender roll), calender speed, and the like. The calender pressure is, for example, 200 to 500 kN/m, preferably 250 to 350 kN/m, the calender temperature is, for example, 70 to 120° C., preferably 80 to 100° C., and the calender speed is, for example, 50 to 300 m/min, preferably 80 to 200 m/min. In addition, as a roll having a hard surface is used as the calender roll and the number of stages is increased, the magnetic layer surface tends to be smoothed, so that the height of the protrusion on the magnetic layer surface can be adjusted by a combination of the calender rolls and the number of stages.

For other various steps for manufacturing a magnetic tape, paragraphs [0067] to [0070] of JP2010-231843A can be referred to.

By going through various steps, a long magnetic tape raw material can be obtained. The obtained magnetic tape raw material is cut (slit) into a width of the magnetic tape to be accommodated around the magnetic tape cartridge by a known cutting machine. The width can be determined according to the standard and is usually ½ inch. ½ inch=12.65 mm.

A servo pattern is usually formed on the magnetic tape obtained by slitting.

Formation of Servo Pattern

A "formation of the servo pattern" can also be referred to as "recording a servo signal". The formation of the servo pattern will be described below.

The servo pattern is usually formed along the longitudinal direction of the magnetic tape. A method of control (servo control) using the servo signal includes timing-based servo (TBS), amplitude servo, frequency servo, and the like.

As shown in a European computer manufacturers association (ECMA)—319 (June 2001), magnetic tapes (generally called "LTO tape") conforming to a linear tape—open (LTO) standard employ a timing-based servo method. In the timing-based servo method, the servo pattern is configured by continuously disposing a plurality of pairs of magnetic stripes (also called a "servo stripe") which are not parallel to each other in the longitudinal direction of the magnetic tape. In the present invention and the present specification, a "timing-based servo pattern" refers to a servo pattern that enables head tracking in the servo system of the timing-based servo method. As described above, the reason why the servo pattern is composed of pairs of magnetic stripes which are not parallel to each other is to teach the servo signal reading element passing on the servo pattern a passing position. Specifically, the pair of magnetic stripes are formed such that an interval thereof continuously changes along the width direction of the magnetic tape, and a relative position between the servo pattern and the servo signal reading element can be known by reading the interval by the servo signal reading element. This relative position information enables tracking of the data track. Therefore, a plurality of servo tracks are usually set on the servo pattern along the width direction of the magnetic tape.

The servo band is configured with the servo pattern continuous in the longitudinal direction of the magnetic tape. Usually, a plurality of servo bands are provided on the magnetic tape. For example, the number of LTO tapes is five. A region sandwiched between two adjacent servo bands is the data band. The data band is configured with a plurality of data tracks, and each data track corresponds to each servo track.

In addition, in one aspect, as shown in JP2004-318983A, information indicating a servo band number (referred to as "servo band ID (identification)" or "UDIM (Unique Data Band Identification Method) information") is embedded in each servo band. This servo band ID is recorded by shifting a specific one of the plurality of pairs of the servo stripes in the servo band so that positions thereof are relatively displaced in a longitudinal direction of the magnetic tape.

Specifically, a way of shifting the specific one of the plurality of pairs of servo stripes is changed for each servo band. Accordingly, since the recorded servo band ID is unique for each servo band, the servo band can be uniquely specified only by reading one servo band with a servo signal reading element.

It should be noted that as a method for uniquely specifying the servo band, there is a method using a staggered method as shown in ECMA-319 (June 2001). In the staggered method, a group of a plurality of pairs of magnetic stripes that are disposed continuously in the longitudinal direction of the magnetic tape and are not parallel to each other (servo stripes) is recorded so as to be shifted in a longitudinal direction of the magnetic tape for each servo band. Since this combination of shifting methods between adjacent servo bands is unique throughout the magnetic tape, it is possible to uniquely specify the servo band in a case of reading a servo pattern with two servo signal reading elements.

As shown in ECMA-319 (June 2001), information indicating a position of the magnetic tape in the longitudinal direction (also referred to as "Longitudinal Position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for forming the servo pattern is called a servo write head. The servo write head usually has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, equal to or less than 1 μm, 1 to 10 μm, equal to or more than 10 μm, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. AC erasing is performed by gradually decreasing an intensity of the magnetic field while reversing a direction of the magnetic field applied to the magnetic tape. On the other hand, DC erasing is performed by applying a unidirectional magnetic field to the magnetic tape. As the DC erasing, there are two methods. A first method is horizontal DC erasing of applying a magnetic field in unidirection along a longitudinal direction of the magnetic tape. A second method is vertical DC erasing of applying a magnetic field in unidirection along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. It should be noted that as shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where the magnetic pattern is transferred to, using the gap, a magnetic tape that has been subjected to horizontal DC erasing, a servo signal obtained by reading the formed servo pattern has a bipolar pulse shape.

Magnetic Tape Cartridge

One aspect of the present invention relates to a magnetic tape cartridge including the magnetic tape.

Details of the magnetic tape included in the magnetic tape cartridge are as described above.

In the magnetic tape cartridge, generally, the magnetic tape is accommodated inside a cartridge main body in a state of being wound around a reel. The reel is rotatably comprised inside the cartridge main body. As the magnetic tape cartridge, a single reel type magnetic tape cartridge having one reel inside the cartridge main body and a dual reel type magnetic tape cartridge having two reels inside the cartridge main body are widely used. In a case where the single reel type magnetic tape cartridge is mounted on a magnetic tape apparatus for recording and/or reproducing data on the magnetic tape, the magnetic tape is pulled out of the magnetic tape cartridge to be wound around the reel on the magnetic tape apparatus side. A magnetic head is disposed in a magnetic tape transportation path from the magnetic tape cartridge to a winding reel. Feeding and winding of the magnetic tape are performed between a reel (supply reel) on the magnetic tape cartridge side and a reel (winding reel) on the magnetic tape apparatus side. During this time, the data is recorded and/or reproduced as the magnetic head and the magnetic layer surface of the magnetic tape come into contact with each other to be slid on each other. On the other hand, in the dual reel type magnetic tape cartridge, both the supply reel and the winding reel are provided inside the magnetic tape cartridge.

The magnetic tape cartridge may include a cartridge memory in one aspect. The cartridge memory may be, for example, a non-volatile memory, and may be a memory in which tension adjustment information has already been recorded or a memory in which tension adjustment information is recorded. The tension adjustment information is information for adjusting the tension applied in the longitudinal direction of the magnetic tape. With respect to the cartridge memory, the description below can be referred to.

The magnetic tape and the magnetic tape cartridge can be suitably used in the magnetic tape apparatus (in other words, a magnetic recording and reproducing system) for controlling the dimension in the width direction of the magnetic tape by adjusting the tension applied in the longitudinal direction of the magnetic tape.

Magnetic Tape Apparatus

One aspect of the present invention relates to the magnetic tape apparatus including the magnetic tape cartridge. In the magnetic tape apparatus, data can be recorded on the magnetic tape and/or data recorded on the magnetic tape can be reproduced by sliding the magnetic layer surface of the magnetic tape in contact with the magnetic head. The magnetic tape apparatus can attachably and detachably include a magnetic tape cartridge according to one aspect of the present invention.

The magnetic tape cartridge can be mounted to the magnetic tape apparatus comprising the magnetic head and used for recording and/or reproducing data. In the present invention and the present specification, the "magnetic tape apparatus" means an apparatus capable of performing at least one of recording data on the magnetic tape or reproducing data recorded on the magnetic tape. Such an apparatus is generally referred to as a drive. The magnetic head included in the magnetic tape apparatus can be the recording head capable of recording data on the magnetic tape, and can also be a reproducing head capable of reproducing data recorded on the magnetic tape. In addition, in one aspect, the magnetic tape apparatus can include both the recording head and the reproducing head as separate magnetic heads. In another aspect, the magnetic head included in the magnetic tape apparatus can have a configuration in which both the recording element and a reproducing element are comprised in one magnetic head. As the reproducing head, a magnetic head (MR head) including a magneto resistive (MR) element capable of reading information recorded on the magnetic tape with high sensitivity as a reproducing element is preferable. As the MR head, various known MR heads (for example, a giant magneto resistive (GMR) head, a tunnel magneto resistive (TMR) head, and the like) can be used. In addition, the magnetic head that records data and/or reproduces data may include a servo pattern reading element. Alternatively, the magnetic head (servo head) comprising the servo pattern reading element may be included in the magnetic tape apparatus as a head different from the magnetic head that records data and/or reproduces data. For example, the magnetic head (hereinafter, also called a "recording and reproducing head") that records data and/or reproduces recorded data can include two servo signal reading elements, and each of the two servo signal reading elements can simultaneously read two servo bands adjacent to each other across the data band. One or more data elements can be disposed between the two servo signal reading elements. An element for recording data (recording element) and an element for reproducing data (reproducing element) are collectively referred to as "data element".

By reproducing data using a reproducing element having a narrow reproducing element width as a reproducing element, data recorded in high-density can be reproduced with high sensitivity. From this viewpoint, the reproducing element width of the reproducing element is preferably 0.8 μm or less. The reproducing element width of the reproducing element can be, for example, 0.3 μm or more. However, it is also preferable to fall below this value from the above viewpoint.

On the other hand, as the reproducing element width becomes narrower, a phenomenon such as defective reproduction due to off-track is more likely to occur. In order to suppress the occurrence of such a phenomenon, it is preferable to use the magnetic tape apparatus that controls the dimension in the width direction of the magnetic tape by adjusting the tension applied in the longitudinal direction of the magnetic tape.

Here, the "reproducing element width" means a physical dimension of the reproducing element width. Such physical dimensions can be measured with an optical microscope, a scanning electron microscope, or the like.

In a case of recording data and/or reproducing recorded data, first, tracking using the servo signal can be performed. That is, by making the servo signal reading element follow a predetermined servo track, the data element can be controlled so as to pass over the target data track. The movement of the data track is performed by changing the servo track read by the servo signal reading element in the tape width direction.

In addition, the recording and reproducing head can also perform recording and/or reproduction to other data bands. In that case, the servo signal reading element may be moved to a predetermined servo band by using the UDIM information described above, and tracking for the servo band may be started.

Figure 2:
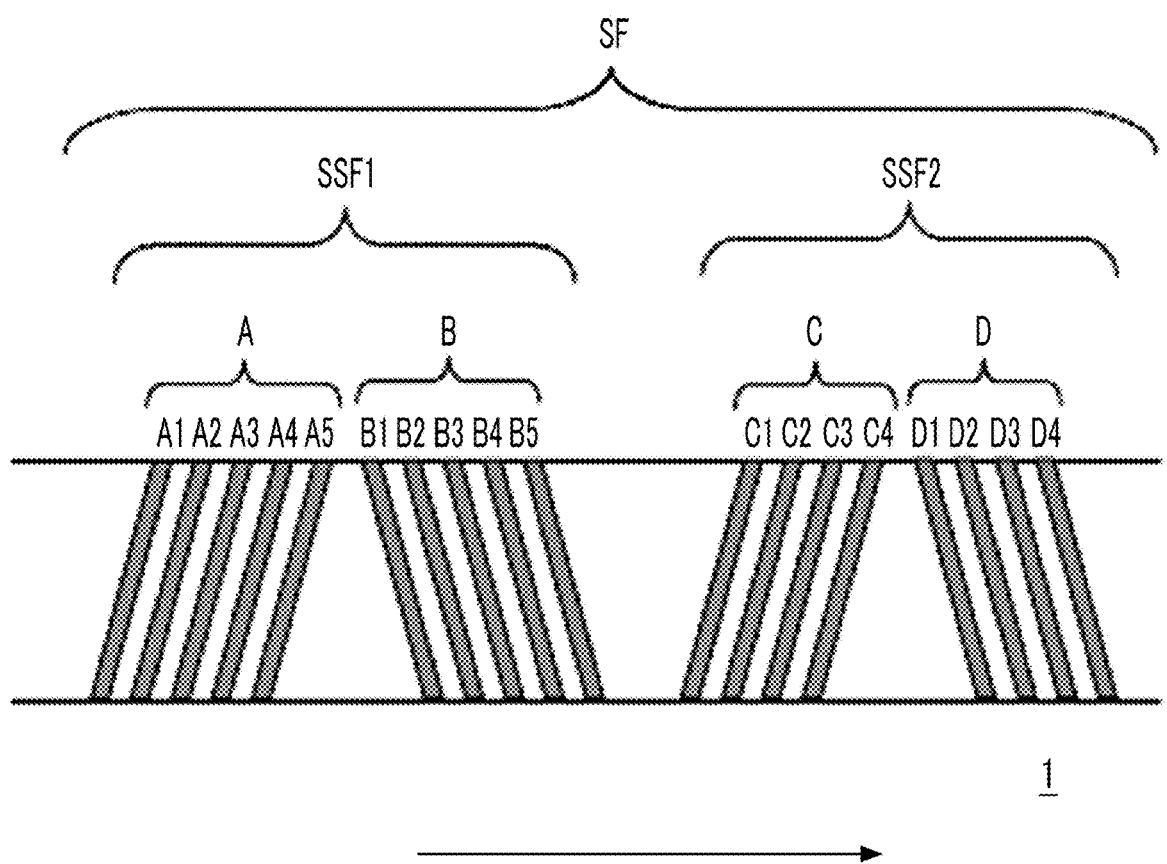
FIG. 2 shows a disposition example of a servo pattern of a linear tape-open (LTO) Ultrium format tape.

FIG. 1 shows a disposition example of the data band and the servo band. In FIG. 1, in the magnetic layer of a magnetic tape MT, a plurality of servo bands 1 are sandwiched between the guide bands 3. A plurality of regions 2 each of which is sandwiched between two servo bands are data bands. The servo pattern is a magnetization region, and is formed by magnetizing a specific region of the magnetic layer with the servo write head. A region magnetized by the servo write head (a position where the servo pattern is formed) is defined by the standard. For example, in an LTO Ultrium format tape which is based on a local standard, a plurality of servo patterns tilted with respect to a tape width direction as shown in FIG. 2 are formed on a servo band, in a case of manufacturing a magnetic tape. Specifically, in FIG. 2, a servo frame SF on the servo band 1 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for identifying the servo frames. FIG. 2 shows one servo frame for illustration. In practice, however, a plurality of servo frames are disposed in each servo band in the running direction in the magnetic layer of the magnetic tape on which the head tracking of the timing-based servo method is performed. In FIG. 2, an arrow shows the running direction. For example, an LTO Ultrium format tape usually has equal to or more than 5,000 servo frames per meter of tape length in each servo band of the magnetic layer.

The magnetic tape apparatus preferably has a tension adjusting mechanism for controlling the dimension in the width direction of the magnetic tape by adjusting the tension applied in the longitudinal direction of the magnetic tape. An example of such a magnetic tape apparatus will be described below with reference to FIG. 3. However, the present invention is not limited to an example shown in FIG. 3.

Structure of Magnetic Tape Apparatus

Figure 3:
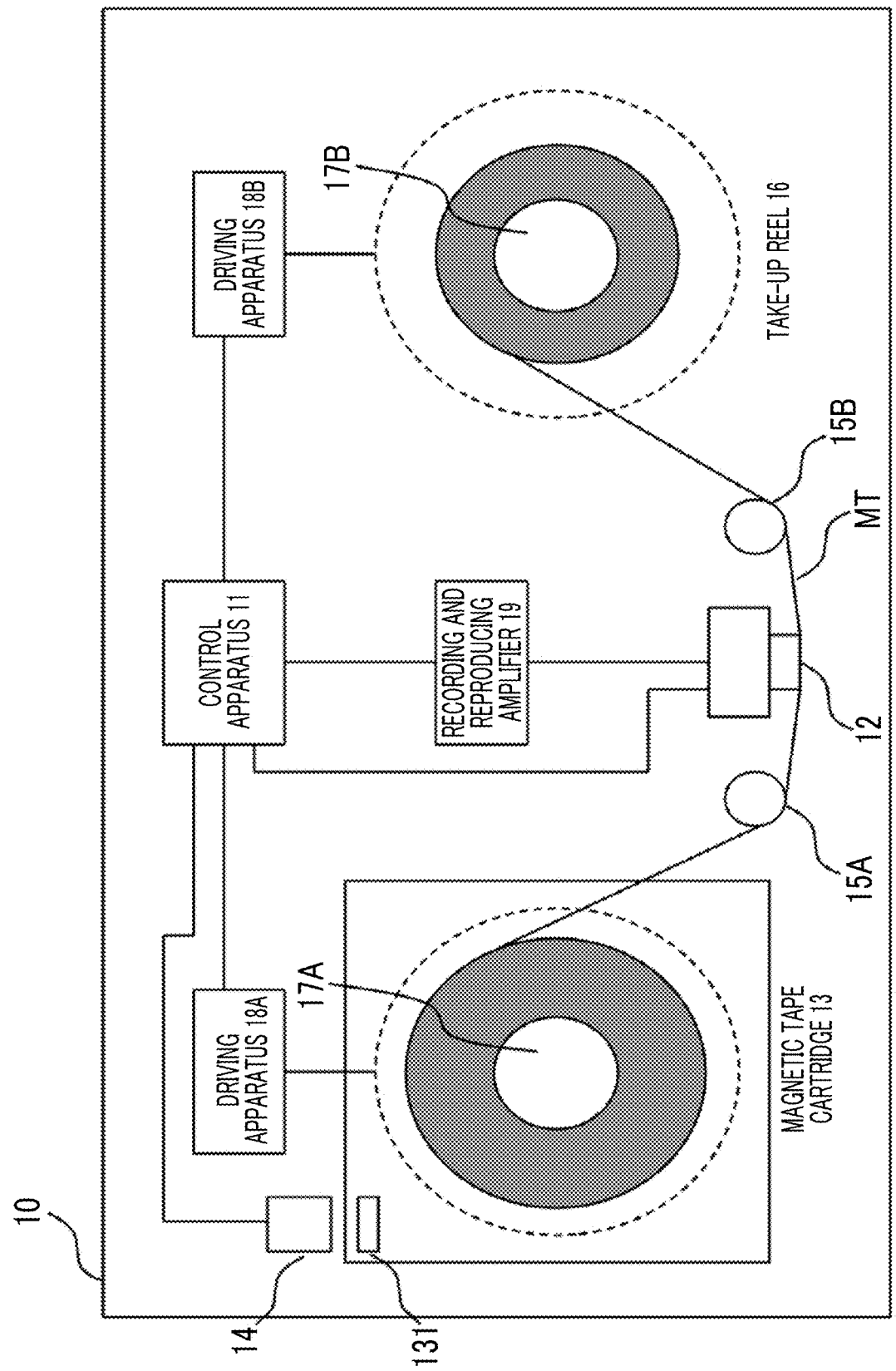
FIG. 3 is a schematic view showing an example of a magnetic tape apparatus.

A magnetic tape apparatus 10 shown in FIG. 3 controls a recording and reproducing head unit 12 according to an instruction from the control apparatus 11, and records and reproduces data on the magnetic tape MT.

The magnetic tape apparatus 10 has a configuration capable of detecting and adjusting tension applied in the longitudinal direction of the magnetic tape from spindle motors 17A and 17B for controlling rotation of a magnetic tape cartridge reel and a take-up reel and their driving apparatuses 18A and 18B.

The magnetic tape apparatus 10 has a configuration in which a magnetic tape cartridge 13 can be loaded.

The magnetic tape apparatus 10 has a cartridge memory reading and writing apparatus 14 capable of reading and writing the cartridge memory 131 in the magnetic tape cartridge 13.

From a magnetic tape cartridge 13 mounted on the magnetic tape apparatus 10, an end portion or a leader pin of the magnetic tape MT is pulled out by an automatic loading mechanism or manually, and the magnetic layer surface of the magnetic tape MT passes on the recording and reproducing head through guide rollers 15A and 15B in a direction contacting with a recording and reproducing head surface of the recording and reproducing head unit 12, and the magnetic tape MT is wound on a take-up reel 16.

The rotation and torque of a spindle motor 17A and a spindle motor 17B are controlled by a signal from the control apparatus 11, and the magnetic tape MT is run at a random speed and tension. A servo pattern previously formed on the magnetic tape can be used to control the tape speed. A tension detection mechanism may be provided between the magnetic tape cartridge 13 and the take-up reel 16 to detect the tension. The tension may be controlled by using the guide rollers 15A and 15B in addition to the control by the spindle motors 17A and 17B.

The cartridge memory reading and writing apparatus 14 is configured to be able to read and write information in the cartridge memory 131 according to instructions from the control apparatus 11. As a communication method between the cartridge memory reading and writing apparatus 14 and the cartridge memory 131, for example, an international organization for standardization (ISO) 14443 method can be adopted.

The control apparatus 11 includes, for example, a controller, a storage unit, a communication unit, and the like.

The recording and reproducing head unit 12 is composed of, for example, a recording and reproducing head, a servo tracking actuator for adjusting a position of the recording and reproducing head in the track width direction, a recording and reproducing amplifier 19, a connector cable for connecting to the control apparatus 11, and the like. The recording and reproducing head is composed of, for example, the recording element for recording data on the magnetic tape, the reproducing element for reproducing data on the magnetic tape, and the servo signal reading element for reading the servo signal recorded on the magnetic tape. For example, one or more recording elements, reproducing elements, and servo signal reading elements are mounted in one magnetic head. Alternatively, each element may be separately provided in a plurality of magnetic heads according to the running direction of the magnetic tape.

The recording and reproducing head unit 12 is configured to be able to record data on the magnetic tape MT in response to an instruction from the control apparatus 11. In addition, the data recorded on the magnetic tape MT is configured to be able to be reproduced in response to an instruction from the control apparatus 11.

The control apparatus 11 has a mechanism for obtaining the running position of the magnetic tape from the servo signal read from the servo band in a case where the magnetic tape MT is running, and controlling the servo tracking actuator such that the recording element and/or the reproducing element are positioned at a target running position (track position). The control of the track position is performed by feedback control, for example. The control apparatus 11 has a mechanism for obtaining a servo band interval from servo signals read from two adjacent servo bands in a case where the magnetic tape MT is running. In addition, a mechanism has a mechanism for controlling the tension in the longitudinal direction of the magnetic tape by controlling the torque of the spindle motor 17A and the spindle motor 17B and/or the guide rollers 15A and 15B such that the servo band interval becomes the target value. The control of the tension is performed by feedback control, for example. Further, the control apparatus 11 can store the obtained information on the servo band interval in a storage unit inside the control apparatus 11, a cartridge memory 131, an external connection device, or the like.

EXAMPLES

Hereinafter, the present invention will be described based on Examples. Here, the present invention is not limited to the aspects shown in the Examples. The "part" described below indicates a "part by mass". In addition, unless otherwise specified, the steps and evaluations described below are performed in an environment with an ambient temperature of 23° C.±1° C. "eq" described below is an equivalent and is a unit that cannot be converted into an SI unit.

The protrusion forming agents used for manufacturing the magnetic tapes of Examples or Comparative Examples are as follows. The protrusion forming agent 1 and the protrusion forming agent 3 are particles having low surface smoothness on the particle surface. The particle shape of the protrusion forming agent 2 is a cocoon-like shape. The particle shape of the protrusion forming agent 4 is close to a true sphere.

Protrusion forming agent 1: ATLAS (composite particle of silica and polymer) manufactured by Cabot Corporation, average particle size 100 nm Protrusion forming agent 2: TGC6020N (silica particles) manufactured by Cabot Corporation, average particle size 140 nm Protrusion Forming Agent 3: Cataloid (aqueous dispersion Sol of silica particle; a dry substance obtained by heating the aqueous dispersion sol and removing a solvent is used as a protrusion forming agent for preparing a protrusion forming agent liquid described later) manufactured by JGC Catalysts & Chemicals, average particle size 120 nm Protrusion Forming Agent 4: PL-10L (aqueous dispersion Sol of silica particle; a dry substance obtained by heating the aqueous dispersion sol and removing a solvent is used as a protrusion forming agent for preparing a protrusion forming agent liquid described later) manufactured by Fuso Chemical Co., Ltd., average particle size 130 nm In Table 1, "BaFe" is a hexagonal barium ferrite powder (coercivity Hc: 196 kA/m, average particle size (average plate diameter) 24 nm).

In Table 1, "SrFe1" is a hexagonal strontium ferrite powder produced by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ are weighed and mixed with a mixer to obtain a raw material mixture.

The obtained raw material mixture is melted with a platinum crucible at a melting temperature of 1390° C., and while stirring the melting liquid, a tap hole provided at the bottom of the platinum crucible is heated to tap the melting liquid in a rod shape at about 6 g/sec. A hot water is rolled and rapidly cooled with a water-cooled twin roller to produce an amorphous body.

280 g of the produced amorphous body is charged into an electric furnace, the temperature is increased to 635° C. (crystallization temperature) at a temperature increasing rate of 3.5° C./minute, and the amorphous body is kept at the same temperature for 5 hours to precipitate (crystallize) hexagonal strontium ferrite particles.

Then, the thus obtained crystallized product containing hexagonal strontium ferrite particles is roughly pulverized in a mortar, 1000 g of zirconia beads having a particle diameter of 1 mm and 800 ml of aqueous acetic acid solution having a concentration of 1% are added to a glass bottle, and dispersion treatment is performed for 3 hours by a paint shaker. Then, the obtained dispersion liquid is separated from the beads and placed in a stainless beaker. The dispersion liquid is allowed to stand at a liquid temperature of 100° C. for 3 hours to perform a dissolution treatment of glass components, and then precipitated with a centrifuge, cleaned by repeated decantation, and dried in a heating furnace at a furnace temperature of 110° C. for 6 hours to obtain a hexagonal strontium ferrite powder.

The hexagonal strontium ferrite powder thus obtained has an average particle size of 18 nm, an activation volume of 902 $nm^3$, an anisotropy constant Ku of 2.2×$10^5$ $J/m^3$, and a mass magnetization as of 49 $A·m^2/kg$.

12 mg of the sample powder is collected from the hexagonal strontium ferrite powder obtained above, and the sample powder is partially dissolved according to dissolution conditions exemplified above, and the elemental analysis of the obtained filtrate is performed by an ICP analyzer, and the surface layer portion content of neodymium atoms is obtained.

Separately, 12 mg of the sample powder is collected from the hexagonal strontium ferrite powder obtained above, and the sample powder is completely dissolved according to dissolution conditions exemplified above, and the elemental analysis of the obtained filtrate is performed by an ICP analyzer, and the bulk content of neodymium atoms is obtained.

The content (bulk content) of neodymium atoms with respect to 100 at % of iron atoms in the hexagonal strontium ferrite powder obtained above is 2.9 at %. In addition, the surface layer portion content of neodymium atoms is 8.0 at %. The ratio between the surface layer portion content and the bulk content, "surface layer portion content/bulk content" is 2.8, and it is confirmed that neodymium atoms are unevenly distributed in the surface layer of the particles.

The fact that the powder obtained above indicates a hexagonal ferrite crystal structure is confirmed by scanning CuKα rays under the conditions of a voltage of 45 kV and an intensity of 40 mA, and measuring the X-ray diffraction pattern under the following conditions (X-ray diffraction analysis). The powder obtained above indicates a crystal structure of a magnetoplumbite type (M-type) hexagonal ferrite. In addition, the crystal phase detected by X-ray diffraction analysis is a magnetoplumbite type single phase.

PANalytical X'PertPro diffractometer, PIXcel detector
Soller slit of incident beam and diffracted beam: 0.017 radians
Fixed angle of dispersion slit: ¼ degree
Mask: 10 mm
Anti-scatter slit: ¼ degree
Measurement mode: continuous
Measurement time per stage: 3 seconds
Measurement speed: 0.017 degrees per second
Measurement step: 0.05 degree In Table 1, "SrFe2" is a hexagonal strontium ferrite powder produced by the following method.

1725 g of $SrCO_3$, 666 g of $H_3BO_3$, 1332 g of $Fe_2O_3$, 52 g of $Al(OH)_3$, 34 g of $CaCO_3$, and 141 g of $BaCO_3$ are weighed and mixed in a mixer to obtain a raw material mixture.

The obtained raw material mixture is melted with a platinum crucible at a melting temperature of 1380° C., and while stirring the melting liquid, a tap hole provided at the bottom of the platinum crucible is heated to tap the melting liquid in a rod shape at about 6 g/sec. A hot water is rolled and rapidly cooled with a water-cooled twin roller to produce an amorphous body.

280 g of the obtained amorphous body is charged into an electric furnace, the temperature is increased to 645° C. (crystallization temperature), and the amorphous body is kept at the same temperature for 5 hours to precipitate (crystallize) hexagonal strontium ferrite particles.

Then, the thus obtained crystallized product containing hexagonal strontium ferrite particles is roughly pulverized in a mortar, 1000 g of zirconia beads having a particle diameter of 1 mm and 800 ml of aqueous acetic acid solution having a concentration of 1% are added to a glass bottle, and dispersion treatment is performed for 3 hours by a paint shaker. Then, the obtained dispersion liquid is separated from the beads and placed in a stainless beaker. The dispersion liquid is allowed to stand at a liquid temperature of 100° C. for 3 hours to perform a dissolution treatment of glass components, and then precipitated with a centrifuge, cleaned by repeated decantation, and dried in a heating furnace at a furnace temperature of 110° C. for 6 hours to obtain a hexagonal strontium ferrite powder.

The hexagonal strontium ferrite powder thus obtained has an average particle size of 19 nm, an activation volume of 1102 $nm^3$, an anisotropy constant Ku of 2.0×$10^5$ $J/m^3$, and a mass magnetization σs of 50 $A·m^2/kg$.

In Table 1, "ε-iron oxide" is an ε-iron oxide powder produced by the following method.

8.3 g of iron (III) nitrate 9 hydrate, 1.3 g of gallium (III) nitrate 8 hydrate, 190 mg of cobalt (II) nitrate 6 hydrate, 150 mg of titanium (IV) sulfate, and 1.5 g of polyvinylpyrrolidone (PVP) are dissolved in 90 g of pure water. While stirring the solution using a magnetic stirrer, in an air atmosphere, 4.0 g of an aqueous ammonia solution with a concentration of 25% is added under a condition of an ambient temperature of 25° C., and the solution is stirred for 2 hours under the temperature condition of an ambient temperature of 25° C. A citric acid solution obtained by dissolving 1 g of citric acid in 9 g of pure water is added to the obtained solution, and the solution is stirred for 1 hour. The powder precipitated after stirring is collected by centrifugation, cleaned with pure water, and dried in a heating furnace having a furnace temperature of 80° C.

800 g of pure water is added to the dried powder, and the powder is dispersed again in water to obtain a dispersion liquid. The temperature of the obtained dispersion liquid is increased to 50° C., and 40 g of the aqueous ammonia solution with a concentration of 25% is added dropwise while stirring. After stirring for 1 hour while maintaining the temperature of 50° C., 14 mL of tetraethoxysilane (TEOS) is added dropwise and stirred for 24 hours. 50 g of ammonium sulfate is added to the obtained reaction solution, the precipitated powder is collected by centrifugation, cleaned with pure water, and dried in a heating furnace at a furnace temperature of 80° C. for 24 hours to obtain a precursor of the ferromagnetic powder.

The obtained precursor of the ferromagnetic powder is loaded into a heating furnace having a furnace temperature of 1000° C. under an air atmosphere and subjected to a heat treatment for 4 hours.

The precursor of the heat-treated ferromagnetic powder is charged into an aqueous solution of 4 mol/L sodium hydroxide (NaOH), and is stirred for 24 hours while maintaining the liquid temperature at 70° C., whereby the silicate compound, which is impurities, is removed from the precursor of the heat-treated ferromagnetic powder.

Then, the ferromagnetic powder from which the silicate compound is removed is collected by centrifugation and cleaned with pure water to obtain the ferromagnetic powder.

In a case where the composition of the obtained ferromagnetic powder is confirmed by a high frequency inductively coupled plasma-optical emission spectrometry (ICP-OES), it is Ga, Co, and Ti-substituted ε-iron oxide ($\varepsilon\text{-}Ga_{0.28}Co_{0.05}Ti_{0.05}Fe_{1.62}O_3$). In addition, X-ray diffraction analysis is performed under the same conditions as those described in regards to SrFe1, and it is confirmed from the peaks of the X-ray diffraction pattern that the obtained ferromagnetic powder has a crystal structure of a single phase of the ε phase (crystal structure of the ε-iron oxide type), which does not include the crystal structures of the α phase and γ phase.

The ε-iron oxide powder thus obtained has an average particle size of 12 nm, an activation volume of 746 $nm^3$, an anisotropy constant Ku of $1.2 \times 10^5$ $J/m^3$, and a mass magnetization σs of 16 $A \cdot m^2/kg$.

The activation volume and anisotropy constant Ku of the hexagonal strontium ferrite powder and the ε-iron oxide powder are values obtained by the method described above using a vibrating sample magnetometer (manufactured by Toei Industry Co., Ltd.) for each ferromagnetic powder.

In addition, the mass magnetization σs is a value measured with a magnetic field intensity of 15 kOe using the vibrating sample magnetometer (manufactured by Toei Industry Co., Ltd.).

Example 1

Composition for Forming the Magnetic Layer
Magnetic Liquid
Ferromagnetic Powder (refer to Table 1): 100.0 parts
Oleic acid: 2.0 parts
Vinyl chloride copolymer (MR-104 manufactured by Kaneka Corporation): 10.0 parts
$SO_3Na$ group-containing polyurethane resin: 4.0 parts
Weight-average molecular weight: 70,000, $SO_3Na$ group: 0.07 meq/g
Additive A: 10.0 partsMethyl ethyl ketone: 150.0 parts-Cyclohexanone: 150.0 parts
Abrasive Liquid
α-Alumina (average particle size: 110 nm): 6.0 parts
Vinyl chloride copolymer (MR-110 manufactured by Kaneka Corporation): 0.7 parts
Cyclohexanone: 20.0 parts
Protrusion forming agent liquid
Protrusion forming agent (refer to Table 1): 1.3 parts
Methyl ethyl ketone: 9.0 parts
Cyclohexanone: 6.0 parts
Lubricant and curing agent liquid
Stearic acid: 3.0 parts
Stearic acid amide: 0.3 parts
Butyl stearate: 6.0 parts
Methyl ethyl ketone: 110.0 partsCyclohexanone: 110.0 parts
Polyisocyanate (CORONATE (registered trademark) L manufactured by Tosoh Corporation): 3.0 parts The above-described additive A is a polymer synthesized by the method described in paragraphs [0115] to [0123] of JP2016-051493A.

Composition for Forming the Non-Magnetic Layer
Non-magnetic inorganic powder (α-iron oxide): 80.0 parts
(average particle size: 0.15 μm, average needle-like ratio: 7, BET (Brunauer-Emmett-Teller) specific surface area: 52 $m^2/g$)
Carbon black (average particle size: 20 nm): 20.0 parts
Electron beam curable vinyl chloride copolymer: 13.0 parts
Electron beam curable polyurethane resin: 6.0 parts
Phenylphosphonic acid: 3.0 parts
Cyclohexanone: 140.0 parts
Methyl ethyl ketone: 170.0 parts
Butyl stearate: 2.0 parts
Stearic acid: 1.0 parts
Composition for Forming the Back Coating Layer
Non-magnetic inorganic powder (α-iron oxide): 80.0 parts
(average particle size: 0.15 μm, average needle-like ratio: 7, BET specific surface area: 52 $m^2/g$)
Carbon black (average particle size: 20 nm): 20.0 parts
Carbon black (average particle size: 100 nm): 3.0 parts
Vinyl chloride copolymer: 13.0 parts
Sulfonic acid group-containing polyurethane resin: 6.0 parts
Phenylphosphonic acid: 3.0 parts
Cyclohexanone: 140.0 parts
Methyl ethyl ketone: 170.0 parts
Stearic acid: 3.0 parts
Polyisocyanate (CORONATE L manufactured by Tosoh Corporation): 5.0 parts
Methyl ethyl ketone: 400.0 parts
Preparation of Composition for Forming Each Layer The composition for forming the magnetic layer is prepared by the following method.

After the components of the magnetic liquid are kneaded and diluted by an open kneader, zirconia ($ZrO_2$) beads with a particle diameter of 0.5 mm (hereinafter, referred to as "Zr beads") are used by a horizontal bead mill dispersing device. At a bead filling percentage of 80% by volume and a rotor tip peripheral speed of 10 m/sec, the residence time per 1 pass is set to 2 minutes, and the dispersion treatment is performed in 12 passes.

After mixing the components of the abrasive liquid, the abrasive liquid is placed in a vertical sand mill dispersing device together with Zr beads having a particle diameter of 1 mm and is adjusted such that the bead volume/(abrasive liquid volume+bead volume) becomes 60%. And then, sand-mill dispersion treatment is performed for 180 minutes, the treated liquid is taken out, and ultrasonic dispersion filtration treatment is performed using a flow-type ultrasonic dispersion filtration device.

The magnetic liquid, the abrasive liquid, the protrusion forming agent liquid, and the lubricant and the curing agent liquid are introduced into a dissolver stirrer, and stirred at a peripheral speed of 10 m/sec for 30 minutes. After that, the composition for forming the magnetic layer is prepared by performing 3-pass treatment at a flow rate of 7.5 kg/min using a flow-type ultrasonic dispersion filtration device and then filtering the resultant through a filter having a pore diameter of 1 μm.

The composition for forming the non-magnetic layer is prepared by the following method.

The above components excluding lubricants (butyl stearate and stearic acid) are kneaded and diluted with an open kneader, and then dispersion treatment is performed with a horizontal bead mill dispersing device. After that, the lubricants (butyl stearate and stearic acid) are added and stirring and mixing are performed by a dissolver stirrer to prepare the composition for forming the non-magnetic layer.

The composition for forming the back coating layer is prepared by the following method.

The above components excluding the lubricant (stearic acid), polyisocyanate, and methyl ethyl ketone (400.0 parts) are kneaded and diluted by an open kneader, and then dispersed by a horizontal bead mill dispersing device. Then, the lubricant (stearic acid), polyisocyanate and methyl ethyl ketone (400.0 parts) are added, and the mixture is stirred with a dissolver stirrer and mixed to prepare the composition for forming the back coating layer.

Producing Magnetic Tape and Magnetic Tape Cartridge

On a biaxial stretching polyethylene naphthalate support having a thickness of 4.2 μm, the composition for forming the non-magnetic layer is applied such that the thickness after drying became 0.7 μm, dried, and then irradiated with an electron beam at an acceleration voltage of 125 kV to obtain an energy of 40 kGy. Then, the composition for forming the magnetic layer is applied and dried such that the thickness after drying became 0.1 μm, and further, the composition for forming the back coating layer is applied and dried such that the thickness after drying became 0.3 μm on the surface of the support opposite to the non-magnetic layer and the surface on which the magnetic layer is formed.

Thereafter, using a 7-stage calender roll composed of metal rolls, calender treatment is performed at a calender speed of 80 m/min, a linear pressure of 294 kN/m, and the calender temperature shown in Table 1. Then, the heat treatment is performed for 36 hours in an environment having an ambient temperature of 70° C. After the heat treatment, the magnetic layer is slit to a width of ½ inch, the slit is fed out, and the magnetic tape was obtained by cleaning the surface of the magnetic layer with a tape cleaning apparatus attached to a apparatus having a winding apparatus such that a nonwoven fabric and a camisoli blade are pressed against the magnetic layer surface.

By recording the servo signal on the magnetic layer of the obtained magnetic tape by a commercially available servo writer, a magnetic tape having data bands, servo bands, and guide bands disposed according to the linear tape—open (LTO) Ultrium format and having servo patterns (timing-based servo pattern) disposed and shaped according to the LTO Ultrium format on the servo bands is obtained. The servo pattern thus formed is a servo pattern according to the description in Japanese industrial standards (JIS) X6175: 2006 and Standard ECMA-319 (June 2001). The total number of servo bands is 5, and the total number of data bands is 4. The magnetic tape (length 960 m) on which the servo signal is recorded is wound on a reel of a magnetic tape cartridge (LTOUltrium 8 data cartridge).

In this way, the magnetic tape cartridge of Example 1 in which the magnetic tape is wound on a reel is produced.

Examples 2 to 10, Comparative Examples 1 to 2

The magnetic tape and the magnetic tape cartridge are obtained by the same method as in Example 1 except that the type of ferromagnetic powder, the type of protrusion forming agent, and/or the calender temperature are changed as shown in Table 1.

Evaluation of Running Stability

Using Each of the Magnetic Tape Cartridges of the Examples and the Comparative Examples, data recording and reproduction are performed by using the magnetic tape apparatus having the configuration shown in FIG. 3. The recording and reproducing head mounted on the recording and reproducing head unit has a reproducing element (reproducing element width: 0.8 μm) and a recording element of equal to or more than 32 channels, and has servo signal reading elements on both sides thereof.

Data is recorded and reproduced by the following method, and the running stability during reproduction is evaluated.

The magnetic tape cartridge is set in the magnetic tape apparatus and the magnetic tape is loaded. Next, while performing servo tracking, the recording and reproducing head unit records pseudo random data having a specific data pattern on the magnetic tape. At that time, the tension applied in the longitudinal direction of the tape is a constant value. Simultaneously with the recording of the data, the value of the servo band interval of the tape total length is measured each 1 m of the longitudinal position and recorded in the cartridge memory.

Then, the data recorded on the magnetic tape are reproduced by the recording and reproducing head unit while performing servo tracking. At that time, the value of the servo band interval is measured simultaneously with reproduction, and the tension applied in the tape longitudinal direction is controlled such that the absolute value of the difference from the servo band interval at the time of recording at the same longitudinal position approaches 0 on the basis of information recorded in the cartridge memory. During reproducing, measurement of the servo band interval and tension control based on it are continuously performed in real time.

The running stability is evaluated using the standard deviation of a reading position PES (position error signal) in the width direction (hereinafter, referred to as "σPES".) based on the servo signal obtained by the servo signal reading element during the reproduction as an index.

The PES is obtained by the following method.

In order to obtain PES, the dimensions of the servo pattern are required. The dimension standards of the servo pattern depend on the generation of LTO. Therefore, first, an average distance AC between four stripes corresponding to an A burst and a C burst and an azimuth angle α of the servo pattern are measured by using a magnetic force microscope or the like.

An average time between five stripes corresponding to the A burst and the B burst over the length of 1 LPOS word is defined as a. An average time between four stripes corresponding to the A burst and the C burst over the length of 1 LPOS word is defined as b. At this time, the value defined by $AC \times (½-a/b)/(2 \times \tan(\alpha))$ represents the reading position PES (position error signal) in the width direction based on the servo signal obtained by the servo signal reading element over the length of one LPOS word. For the magnetic tape, the standard deviation (σPES) of the PES obtained by the above method is calculated for a region in the longitudinal direction of the tape over a length of 30 m to 200 m, where a terminal on the side wound onto the reel of the magnetic tape cartridge is called the inner terminal, and a terminal on the opposite side is called the outer terminal, and the outer terminal is set to 0 m. In a case where σPES is less than 70 nm, it can be determined that the running stability is excellent.

Evaluation of Magnetic Tape (1) Difference ($S_{0.1}$–$S_{1.6}$)

Using a tape spacing analyzer (TSA) (manufactured by Micro Physics), spacing measurements under pressing force of 0.5 atm, 0.6 atm, 0.8 atm, 1.0 atm, 1.3 atm and 1.6 atm are sequentially performed by the following method.

Five sample pieces having a length of 5 cm are cut out from each of the magnetic tapes of Examples and Comparative Examples, and the n-hexane cleaning of each sample piece is performed by the method described above. On the magnetic layer surface of the magnetic tape (that is, the sample piece) after the n-hexane cleaning, a glass plate (glass plate (model number: WG 10530) manufactured by Thorlabs, Inc.) comprised in the TSA is disposed, and this hemisphere is pressed against the back coating layer surface of the magnetic tape at a pressure of 0.5 atm using a hemisphere made of urethane comprised in the TSA as a pressing member. In this state, white light is emitted from a stroboscope comprised in the TSA to a certain region (150,000 to 200,000 μm$^2$) on the magnetic layer surface of the magnetic tape through the glass plate, and the resulting reflected light is received by a charge-coupled device (CCD) through an interference filter (a filter for selectively transmitting light having wavelength of 633 nm), thereby obtaining an interference fringe image generated in the unevenness of this region.

The image is divided into 300,000 points to obtain a distance (spacing) from the surface of the glass plate on the magnetic tape side of each point to the magnetic layer surface of the magnetic tape, which is used as a histogram, and the mode value of the histogram is obtained as the spacing under the pressing force of 0.5 atm.

The same sample piece is further pressed at a higher pressure, and the spacing measured under each pressing force is sequentially obtained under the pressing force of 0.6 atm, 0.8 atm, 1.0 atm, 1.3 atm, and 1.6 atm by the above method.

Equation 1 and Equation 2 are derived from the spacing values under each pressing force thus obtained for each sample piece as shown above, and $S_{0.1}$ is calculated from the derived Equation 2. The arithmetic average of $S_{0.1}$ calculated for the five sample pieces is set to $S_{0.1}$ of the magnetic tape to be measured.

In addition, for the five sample pieces, the arithmetic average of the measured values of the spacing obtained by the measurement under the pressing force of 1.6 atm performed as respectively described above is set to $S_{1.6}$ of the magnetic tape to be measured.

Then, as a difference between $S_{0.1}$ and $S_{1.6}$ thus obtained, the difference ($S_{0.1}$–$S_{1.6}$) of the magnetic tape to be measured is obtained.

The values obtained above are shown in Table 1.

(2) Tape Thickness 10 tape samples (length 5 cm) are cut out from a random part of the magnetic tape taken out from the magnetic tape cartridge of the Examples and the Comparative Examples, and these tape samples are stacked to measure the thickness. The thickness is measured using a Millimar 1240 compact amplifier manufactured by MARH and a digital thickness meter of the Millimar 1301 lead probe. A value (thickness per one tape sample) obtained by dividing the measured thickness by 1/10 is defined as the tape thickness. For each magnetic tape, the tape thickness is 5.3 μm.

The results described above are shown in Table 1.

TABLE 1

| | Ferromagnetic powder | Protrusion forming agent | Calender temperature (° C.) | $S_{0.1}$-$S_{1.6}$ (nm) | $S_{0.1}$ (nm) | $S_{1.6}$ (nm) | σPES (nm) |
|---|---|---|---|---|---|---|---|
| Example 1 | BaFe | Protrusion forming agent 1 | 80 | 23 | 36 | 13 | 41 |
| Example 2 | BaFe | Protrusion forming agent 1 | 100 | 16 | 28 | 12 | 33 |
| Example 3 | BaFe | Protrusion forming agent 2 | 70 | 30 | 40 | 10 | 52 |
| Example 4 | BaFe | Protrusion forming agent 2 | 80 | 28 | 38 | 10 | 52 |
| Example 5 | BaFe | Protrusion forming agent 2 | 100 | 25 | 34 | 9 | 44 |
| Example 6 | BaFe | Protrusion forming agent 3 | 80 | 28 | 40 | 12 | 56 |
| Example 7 | BaFe | Protrusion forming agent 3 | 100 | 21 | 30 | 9 | 52 |
| Example 8 | SrFe1 | Protrusion forming agent 1 | 80 | 24 | 35 | 11 | 41 |
| Example 9 | SrFe2 | Protrusion forming agent 1 rotrusion | 80 | 23 | 34 | 11 | 43 |
| Example 10 | ε-iron oxide | Protrusion forming agent 1 | 80 | 24 | 34 | 10 | 42 |

TABLE 1-continued

| | Ferromagnetic powder | Protrusion forming agent | Calender temperature (° C.) | $S_{0.1}$-$S_{1.6}$ (nm) | $S_{0.1}$ (nm) | $S_{1.6}$ (nm) | σPES (nm) |
|---|---|---|---|---|---|---|---|
| Comparative Example 1 | BaFe | Protrusion forming agent 4 | 80 | 36 | 39 | 3 | 81 |
| Comparative Example 2 | BaFe | Protrusion forming agent 4 | 100 | 33 | 35 | 2 | 74 |

From the results shown in Table 1, it can be confirmed that the magnetic tape of the Examples is a magnetic tape capable of exhibiting excellent running stability in a magnetic tape apparatus for controlling the dimension in the width direction of the magnetic tape by adjusting the tension applied to the longitudinal direction of the magnetic tape.

One aspect of the present invention is useful in various data storage technical fields.

What is claimed is:

1. A magnetic tape comprising:
a non-magnetic support; and
a magnetic layer containing a ferromagnetic powder,
wherein a difference, $S_{0.1}$–$S_{1.6}$, between a spacing $S_{0.1}$ and a spacing $S_{1.6}$ each obtained after n-hexane cleaning on a surface of the magnetic layer is equal to or less than 32 nm,
the spacing $S_{0.1}$ is a value obtained as a spacing under a pressing force of 0.1 atm from a relational expression between a pressure and a spacing obtained by performing a spacing measurement on the surface of the magnetic layer by an optical interference method under a pressing force of each of a plurality of different pressures after n-hexane cleaning, and
the spacing $S_{1.6}$ is a spacing measured on the surface of the magnetic layer by the optical interference method under a pressing force of 1.6 atm after n-hexane cleaning.

2. The magnetic tape according to claim 1,
wherein the difference is equal to or less than 30 nm.

3. The magnetic tape according to claim 1,
wherein the difference is equal to or more than 10 nm and equal to or less than 30 nm.

4. The magnetic tape according to claim 1,
wherein the magnetic layer contains inorganic oxide particles.

5. The magnetic tape according to claim 4,
wherein the inorganic oxide particles are composite particles of an inorganic oxide and a polymer.

6. The magnetic tape according to claim 1,
wherein a non-magnetic layer containing a non-magnetic powder is provided between the non-magnetic support and the magnetic layer.

7. The magnetic tape according to claim 1,
wherein a back coating layer containing a non-magnetic powder is provided on a surface side of the non-magnetic support opposite to a surface side having the magnetic layer.

8. The magnetic tape according to claim 1,
wherein a tape thickness is equal to or less than 5.3 μm.

9. A magnetic tape cartridge comprising the magnetic tape according to claim 1.

10. The magnetic tape cartridge according to claim 9,
wherein the difference is equal to or less than 30 nm.

11. The magnetic tape cartridge according to claim 9,
wherein the difference is equal to or more than 10 nm and equal to or less than 30 nm.

12. The magnetic tape cartridge according to claim 9,
wherein the magnetic layer contains inorganic oxide particles.

13. The magnetic tape cartridge according to claim 12,
wherein the inorganic oxide particles are composite particles of an inorganic oxide and a polymer.

14. The magnetic tape cartridge according to claim 9,
wherein a non-magnetic layer containing a non-magnetic powder is provided between the non-magnetic support and the magnetic layer of the magnetic tape.

15. The magnetic tape cartridge according to claim 9,
wherein a back coating layer containing a non-magnetic powder is provided on a surface side of the non-magnetic support opposite to a surface side having the magnetic layer of the magnetic tape.

16. The magnetic tape cartridge according to claim 9,
wherein a tape thickness of the magnetic tape is equal to or less than 5.3 μm.

17. A magnetic tape apparatus comprising the magnetic tape cartridge according to claim 9.

* * * * *